United States Patent
Faulkner et al.

(10) Patent No.: US 10,754,526 B2
(45) Date of Patent: Aug. 25, 2020

(54) INTERACTIVE VIEWING SYSTEM

(71) Applicant: Microsoft Technology Licensing, LLC, Redmond, WA (US)

(72) Inventors: Jason Thomas Faulkner, Seattle, WA (US); Yingying Geng, Redmond, WA (US); Casey Baker, Bellingham, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,028

(22) Filed: Dec. 20, 2018

(65) Prior Publication Data

US 2020/0201521 A1  Jun. 25, 2020

(51) Int. Cl.
| | |
|---|---|
| *G06F 3/048* | (2013.01) |
| *G06F 3/0484* | (2013.01) |
| *G06F 3/0481* | (2013.01) |
| *G06F 3/0488* | (2013.01) |
| *G06F 3/16* | (2006.01) |

(52) U.S. Cl.
CPC ...... *G06F 3/04845* (2013.01); *G06F 3/04815* (2013.01); *G06F 3/04883* (2013.01); *G06F 3/167* (2013.01); *G06F 2203/04805* (2013.01); *G06F 2203/04806* (2013.01); *G06F 2203/04808* (2013.01)

(58) Field of Classification Search
CPC .................................................. G06F 3/04845
USPC ........................................................ 715/728
See application file for complete search history.

(56) References Cited

U.S. PATENT DOCUMENTS

| | | | |
|---|---|---|---|
| 4,815,029 A | 3/1989 | Barker | |
| 7,327,349 B2 * | 2/2008 | Robbins | G06F 3/0481 345/156 |
| 8,619,112 B2 | 12/2013 | Kristiansen et al. | |

(Continued)

FOREIGN PATENT DOCUMENTS

WO  2009022243 A1  2/2009

OTHER PUBLICATIONS

Shafiei, et al., "Jiku Live: A Live Zoomable Video Streaming System", In Proceedings of the 20th ACM International Conference on Multimedia, Oct. 29, 2012, pp. 1265-1266.

(Continued)

*Primary Examiner* — William D Titcomb
(74) *Attorney, Agent, or Firm* — Newport IP, LLC; Han Gim

(57) ABSTRACT

A tool for interacting with a rendered environment is configured to render a representation of a real-world environment and receive input data indicative of a position for a zoom window to be placed within the representation. The zoom window is rendered having a size that is determined based on one or more criteria. A magnified view of a portion of the representation is rendered that is proximate to the position of the zoom window. Input data is received that is indicative of a first gesture indicative of a new position for the zoom window. The zoom window is repositioned on the UI and the size of the zoom window is maintained during the repositioning. Within the zoom window, a magnified view of a portion of the representation is rendered that is proximate to the new position of the zoom window. The zoom window is movable to any rendered portion of the representation.

20 Claims, 24 Drawing Sheets

(56) References Cited

U.S. PATENT DOCUMENTS

| | | |
|---|---|---|
| 8,898,593 B2 | 11/2014 | Sgro et al. |
| 9,448,719 B2 | 9/2016 | Havilio et al. |
| 9,529,515 B2* | 12/2016 | Jitkoff .................. G06F 3/0485 |
| 9,626,084 B2 | 4/2017 | Waggoner et al. |
| 9,749,367 B1 | 8/2017 | Kirby et al. |
| 9,952,661 B2 | 4/2018 | Kim et al. |
| 10,007,352 B2 | 6/2018 | Poulos et al. |
| 2010/0262907 A1 | 10/2010 | Shoemaker et al. |
| 2010/0287493 A1 | 11/2010 | Majumder et al. |
| 2011/0141031 A1 | 6/2011 | Mccullough et al. |
| 2011/0270923 A1 | 11/2011 | Jones et al. |
| 2012/0096343 A1 | 4/2012 | Beck et al. |
| 2012/0218468 A1 | 8/2012 | Tan et al. |
| 2013/0009997 A1 | 1/2013 | Boak et al. |
| 2014/0101605 A1* | 4/2014 | Udvardy ............... G06F 3/0485 715/800 |
| 2014/0245223 A1 | 8/2014 | Park et al. |
| 2014/0320587 A1 | 10/2014 | Oyman |
| 2015/0286400 A1 | 10/2015 | Nakamura |
| 2015/0309565 A1 | 10/2015 | Beri et al. |
| 2015/0379964 A1* | 12/2015 | Lee .......................... G09G 5/12 345/173 |
| 2016/0098187 A1* | 4/2016 | Kim .................... G06F 3/04817 715/768 |
| 2016/0259508 A1 | 9/2016 | Eccleston et al. |
| 2016/0349970 A1* | 12/2016 | Everitt .................. G06F 17/212 |
| 2017/0357317 A1* | 12/2017 | Chaudhri .............. G06F 3/0412 |
| 2018/0011627 A1 | 1/2018 | Siracusano, Jr. |
| 2018/0139405 A1 | 5/2018 | Baek et al. |
| 2018/0220080 A1 | 8/2018 | Mojaver |
| 2018/0307754 A1* | 10/2018 | Somlai-Fischer ........................... G06F 3/04845 |
| 2020/0201512 A1 | 6/2020 | Faulkner et al. |
| 2020/0201522 A1 | 6/2020 | Faulkner et al. |

OTHER PUBLICATIONS

"Non Final Office Action Issued in U.S. Appl. No. 16/228,243", dated Mar. 19, 2020, 17 Pages.

"International Search Report and Written Opinion Issued in PCT Application No. PCT/US2019/065574", dated Mar. 27, 2020, 12 Pages.

"International Search Report and Written Opinion Issued in PCT Application No. PCT/US2019/065832", dated Mar. 30, 2020, 14 Pages.

"International Search Report and Written Opinion Issued in PCT Application No. PCT/US2019/065573", dated Apr. 3, 2020, 13 Pages.

"Final Office Action Issued in U.S. Appl. No. 16/228,243", dated Jun. 2, 2020, 14 Pages.

"Non Final Office Action Issued in U.S. Appl. No. 16/228,104", dated Jul. 6, 2020, 16 Pages.

* cited by examiner

INTERACTIVE VIEWING SYSTEM

BACKGROUND

Some computing systems provide collaborative environments that facilitate communication between two or more participants. A system providing a collaborative environment can allow participants to exchange live video, live audio, and other forms of data within a communication session. A collaborative environment can take on any suitable communication session format including but not limited to private chat sessions, multi-user editing sessions, group meetings, broadcasts, etc.

There are a number of drawbacks with some existing systems when it comes to the promotion of user engagement. Inefficiencies with interaction with the collaborative environment can be detrimental to user productivity and use of computing resources. When software applications do not optimize user engagement, production loss and inefficiencies with respect to computing resources can be exacerbated when a participant is unable to quickly and easily view the collaborative environment and selectively interact with the rendered content. For example, a live meeting may involve displaying an image of a participant discussing a topic, presenting materials on a display within the meeting environment, and drawing figures on a whiteboard. Existing systems lack the tools necessary to quickly and easily interact with such meeting activities. Such systems require that users perform a number of menu-driven tasks to zoom into areas of interest. For example, when a participant needs further detail on a part of the rendered meeting environment, the participant must increase the zoom of the image. However, the entire rendered image is magnified around the center of the image, and the desired zoom area may or may not be within the new magnified image. Additionally, loss of fidelity typically results. It is with respect to these considerations and others that the disclosure made herein is presented.

SUMMARY

An improved human-computer interface ("HCI") is disclosed herein for interacting with representations of various environments, such as a three-dimensional ("3D") of a real-world environment, and in some embodiments, scenarios pertaining to a videoconference session. In various embodiments, a system is described for interacting with a communication environment that utilizes video and other content. Such a system may be referred to as an interactive viewing system. The interactive viewing system may be provided in conjunction with a videoconference session. The interactive viewing system may facilitate a shared communication environment that facilitates collaboration and other activities. For example, the interactive viewing system may be presented on each participant's device in a group control state that provides group control of viewing and editing functions, with an option to grant control to individual users. The rendered environment may include a view of various viewing and editing tools that can be viewed by each participant as the tools are being used. In some embodiments, the rendered videoconference session may be referred to as a stage canvas. In one embodiment, the viewing system allows users in real time to magnify or reduce details in the stage canvas videoconference experience and manipulate where and how the stage canvas is rendered. The viewing system may interact with but is not limited to video, imagery, 3D models, office applications, captured environments/objects, annotations, presentation, shared locations, notes, expressions, or other shared activity. In some embodiments, a duplicate stage canvas layer may be implemented over the active stage canvas that is viewable to the user or the interacting group and manipulated as an independent annotation, picture, or other productivity file type. The system thus allows any activity to be made available outside of the videoconference session. Additionally, the system may allow any activity to be recorded and available at a different time.

In some embodiments, a free-floating zoom lens or window can be moved over the stage canvas, allowing a user to magnify a selected portion of the rendered screen experience, and tag the selected portion for further review and manipulation via the interactive viewing system. In some embodiments, voice and/or gesture commands may be used to control actions of the interactive viewing system. Furthermore, the zoom window may be moved to any area of the depicted environment. In some embodiments, the zoom window may be attached to a particular object within the rendered environment, and the zoom window may follow the object as the object moves, or as the rendered perspective changes. The zoom scale inside the zoom window may remain constant during repositioning of the zoom window. Additionally, the size of the zoom window may remain unchanged during repositioning of the zoom window.

In some embodiments, the zoom window may be configured to provide controls for interacting with the rendered environment. A user may, for example, interact with images being rendered within the zoom window. The images may be saved and edited as a screen snippet or other multimedia object. The controls may also include editing image sources for the rendered environment and changing perspectives on the rendered environment, thus allowing for improved fidelity and viewing angles for images within the zoom window.

Existing systems for allowing users to manually interact with representations require users to perform a number of menu-driven tasks. The user can spend a considerable amount of time searching through available items to find and change settings, invoke additional applications to perform functions that are not native to the rendering application, and to find content that is relevant to a particular part of a rendered activity. This can lead to extensive and unnecessary consumption of computing resources.

The examples described herein are provided within the context of collaborative environments, e.g., private chat sessions, multi-user editing sessions, group meetings, live broadcasts, etc. For illustrative purposes, it can be appreciated that a computer managing a collaborative environment involves any type of computer managing a communication session where two or more computers are sharing data. For illustrative purposes, an "event" is a particular instance of a communication session, which may have a start time, an end time, and other parameters for controlling how data is shared and displayed to users participating in the communication session.

The techniques disclosed herein can enable users to efficiently manage a rendered view, such as a 3-D representation of a real-world collaborative environment. This can allow for more efficient use of computing resources such as processor cycles, memory, network bandwidth, and power, as compared to previous solutions. Other technical benefits not specifically mentioned herein can also be realized through implementations of the disclosed subject matter.

It should be appreciated that various aspects of the subject matter described briefly above and in further detail below can be implemented as a hardware device, a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, network appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Figure 1:
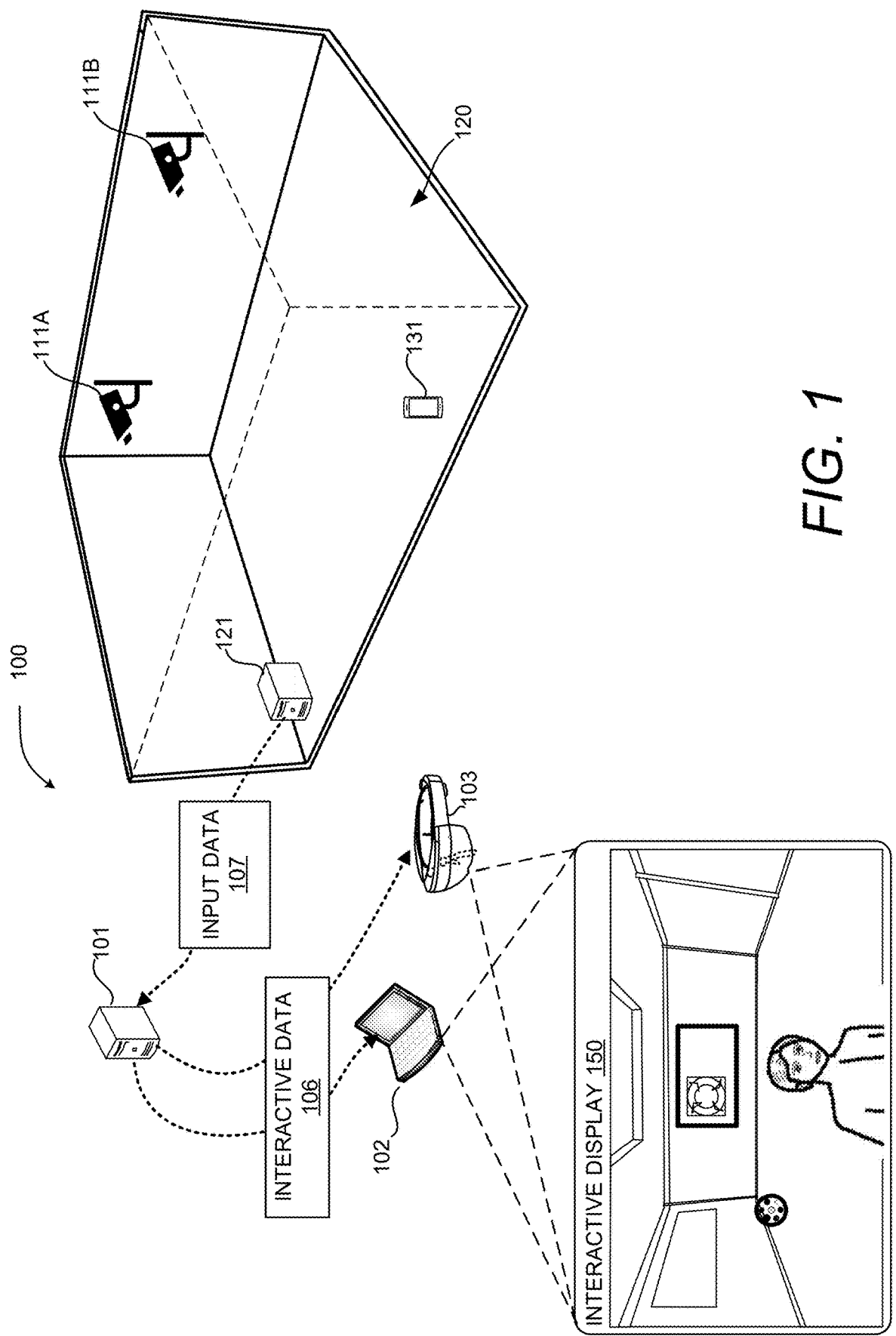
FIG. 1 is a computing system diagram illustrating aspects of an operating environment for the embodiments disclosed herein.

The following Detailed Description describes an improved HCI for viewing and editing objects in a representation of an environment, such as a 3-D representation of a real world environment. This can result in more efficient use of computing resources such as processor cycles, memory, network bandwidth, and power, as compared to previous solutions relying upon inefficient interaction, selection, and editing of a rendered environment and objects within the rendered environment. Technical benefits other than those specifically described herein might also be realized through implementations of the disclosed technologies.

A networked meeting represents one popular form of electronic collaboration that utilizes an application program (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., SKYPE, and SKYPE FOR BUSINESS and TEAMS provided by MICROSOFT CORPORATION, of Redmond, Wash.) to facilitate communication between two or more participants present at separate physical locations. Participants of a communication session in a networked meeting are able to exchange live video, audio, and other types of content to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

Various types of computing devices can be utilized to participate in networked meetings including, but not limited to, smartphones, tablet computing devices, set-top boxes, smart televisions, video game systems, and AR, VR, and MR devices.

While meeting participants can view a real-world environment such as a meeting space, the ability to interact with the rendered environment has been limited. As a result, remote participants must typically to settle for the images and video feed that is provided by the rendering application regardless of the quality and fidelity of the feed. Furthermore, participants must typically use offline resources to supplement their access to the meeting materials, such as requesting copies of presented documents and files, requesting meeting participants to take photos of items of interest, and so on. The disclosed HCI addresses the technical considerations set forth above, and potentially others, thereby providing technical benefits to computing systems implementing the disclosed technologies.

In various embodiments, a viewing and editing system is disclosed that can be used in conjunction with collaborative activities such as networked meetings. Such a system may also be referred to herein as a tool but should not be construed as having different or lesser functionality than a system. In one embodiment, the viewing and editing tool includes a window or lens that is rendered on a representation of a live meeting. The window or lens can be moved to any portion of the representation, and further can be resized and/or scaled to zoom on areas that are proximate to the window or lens. In some embodiments, the zoom window/lens may be rotated or panned, based on a rotation input gesture or a lateral scrolling gesture. Additional features can be implemented to enable the user to better interact with such features. For example, in some embodiments, the thickness or other attribute of the border of the window or lens may be changed to indicate the zoom amount.

In some embodiments, contents of the window or lens can be captured, saved, and edited. In some embodiments, options for further action can be determined based on a context of the window contents, the current meeting status and activity, and a role of the user. Options for further action may include, for example, sending the contents to a participant or other recipient.

The viewing and editing tool may include capabilities that facilitate the user's interaction with the content and interaction with other participants of the rendered activity. In the context of a live video stream, the user may interact with the video stream itself, such as with the frames of the video stream. Additionally, the viewing and editing tool may provide the capability to interact with the depicted content of the video stream such as presented documents and files. The viewing and editing tool may further provide the capability to interact with aspects of the environment depicted in the video stream such as devices that are depicted in the video stream or devices that are capable of providing input to the video stream. The enabled user interactions may include updating content, sharing of the content, and interacting with other participants via the content.

In some embodiments, the depicted environment (e.g., meeting) may be represented as an object that can be sent to users who may access the meeting my interacting with the object. For example, a recipient may be able to click on the object to join the meeting or to view details about the meeting.

In some embodiments, the viewing and editing tool may facilitate detection of an object or other content that is being rendered and the source of the object or content. The object may be a document that can be identified, searched for, accessed, downloaded, and edited by the user. For example, a currently rendered slide of a Powerpoint presentation may be used to identify a source file of the presentation. In another example, if the rendered object is a device such as an electronic whiteboard, then the device may be identified, and the user may be provided an option, if authorized, to control or provide input to the device such as inputting annotations to the whiteboard. In other embodiments, a virtual whiteboard may be instantiated and rendered that can be edited by the participants via the viewing and editing tool. If the device is a camera, the user may be provided the ability to change the focus of the camera or change other parameters of the camera. The viewing and editing tool may continuously identify the original source data for content that is a part of the rendered environment. This allows users to quickly have access to original content rather than viewing an image of the content and searching for the content as a separate task. The viewing and editing tool thus provides a focused view of content that is contextually available to the group during the course of the communication session.

In some embodiments, when multiple video sources are available, the viewing and editing tool may determine, based on the position of the zoom window within the rendered environment, which video source may provide the best fidelity. For example, the primary video feed that is used for the main video feed may not have the highest available resolution. When a user selects a position for the zoom window, a higher resolution image source, if available, may be used to provide a higher fidelity zoom of the selected area.

In some embodiments, captured images of an activity such as a meeting may be linked to a time window. For example, an image that is selected for editing may be associated with a default time window such as 30 seconds. The viewing and editing tool may provide a timeline tool to traverse the timeframe during which the activity occurred and for which a recording is available. In this way, the user may view various times of the activity, from the perspective of the zoom window, and further be provided various editing options over the available timeframes.

In some embodiments, the actions and features that are activated by the user during an editing/viewing session may be recorded and may be replayed by the user.

In some embodiments, actions available to the viewing and editing tool may be dynamically updated based on the detected activity in the room. For example, if a presentation is being rendered on a display within the rendered environment, the viewing and editing tool may update user options to include actions available for accessing and editing the display and/or the presentation source.

In some embodiments, the actions available on the viewing and editing tool may be based on an assigned role for the user. For example, some users may be assigned a producer role and may be allowed to edit content before the content is shared on the network. Other users may have a participant role or a group role and may be allowed to control their own settings or collectively control settings for the group.

Turning now to the figures (which might be referred to herein as a "FIG." or "FIGS."), additional details will be provided regarding an improved HCI disclosed herein with reference to the accompanying drawings. The figures show, by way of illustration, specific configurations or examples. Like numerals represent like or similar elements throughout the FIGS. In the FIGS., the left-most digit(s) of a reference number generally identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

FIG. 1 illustrates an example scenario involving a system 100 associated with tools for interacting with a rendered environment such as a collaborative environment. The rendered environment may include a workspace 120 that may be an office, conference room, auditorium, or other space that is configured to allow individuals to meet and collaborate. The workspace 120 may include cameras 111A and 111B. The environment may include other devices such as a smart beacon 131. Other input sources (not shown in FIG. 1) may include sensors and other devices. In some embodiments, a computing device 121 may receive data from cameras 111A, 111B, and 111C, and microphones (not shown in FIG. 1) as well as other input devices, and send the collected data as input data 107 to a collaboration server 101.

The collaboration server 101 may process the input data 107 and send interactive data 106 to one or more user devices such as a laptop computer 102 and a VR display 103. Interactive data 106 may include data that is operable to render an interactive display 150 that may include a representation of workspace 120. The interactive data 106 can comprise any image, document, video data, audio data, or any other information that can be used as data for rendering the representation of workspace 120 and activity that is occurring within the workspace 120 as captured by cameras 111A and 111B. The interactive data 106 can also include other forms of data such as meeting requests, which can identify a number of attendees, titles associated with each attendee, and other related information. The interactive data 106 can also indicate parameters for an event, such as a start time, end time, and a location. For example, the interactive data 106 can include meeting information indicating a list of attendees, the roles of each attendee, a date, a time, and a location.

The interactive data 106 can include any information that conveys viewing and editing preferences for parameters or settings related to the collaborative environment. For instance, the interactive data 106 can define user interface configurations, volume levels, camera angles, or other parameters that have been utilized by a particular user. The interactive data 106 can also include historical information. For instance, the interactive data 106 can include a list of meetings, the attendees of each meeting, and UI layouts used in each meeting.

The input data 107 may include descriptions of hardware that is available to the computing device 121. For example, the input data 107 can describe aspects of various input devices, sensors, lights, microphones, sound dampening equipment and other hardware that were available to computing device 121. The input data 107 can also describe specifications for display screens or specifications of computers in communication with the system 100.

The input data 107 can also describe specifications of the available hardware, such as, but not limited to, sensitivity levels, zoom levels, etc. The input data 107 can also describe the position of each device and a scope for each device. For instance, the input data 107 can describe a location, position and viewing area of a particular camera, e.g., that a camera can capture speakers at a particular podium, on a stage, etc. In another example, the input data 107 can identify the location of a room microphone and coordinates defining the range of the microphone. In this example, the input data 107 indicates the availability of two cameras 111 (111A-111B). The interactive display 150 may use the list of devices to provide editing and viewing options as further described herein. The input data 107 may also indicate that the first camera 111A is directed towards a first area, and that the second camera 111B is directed towards a second area.

Figure 2:
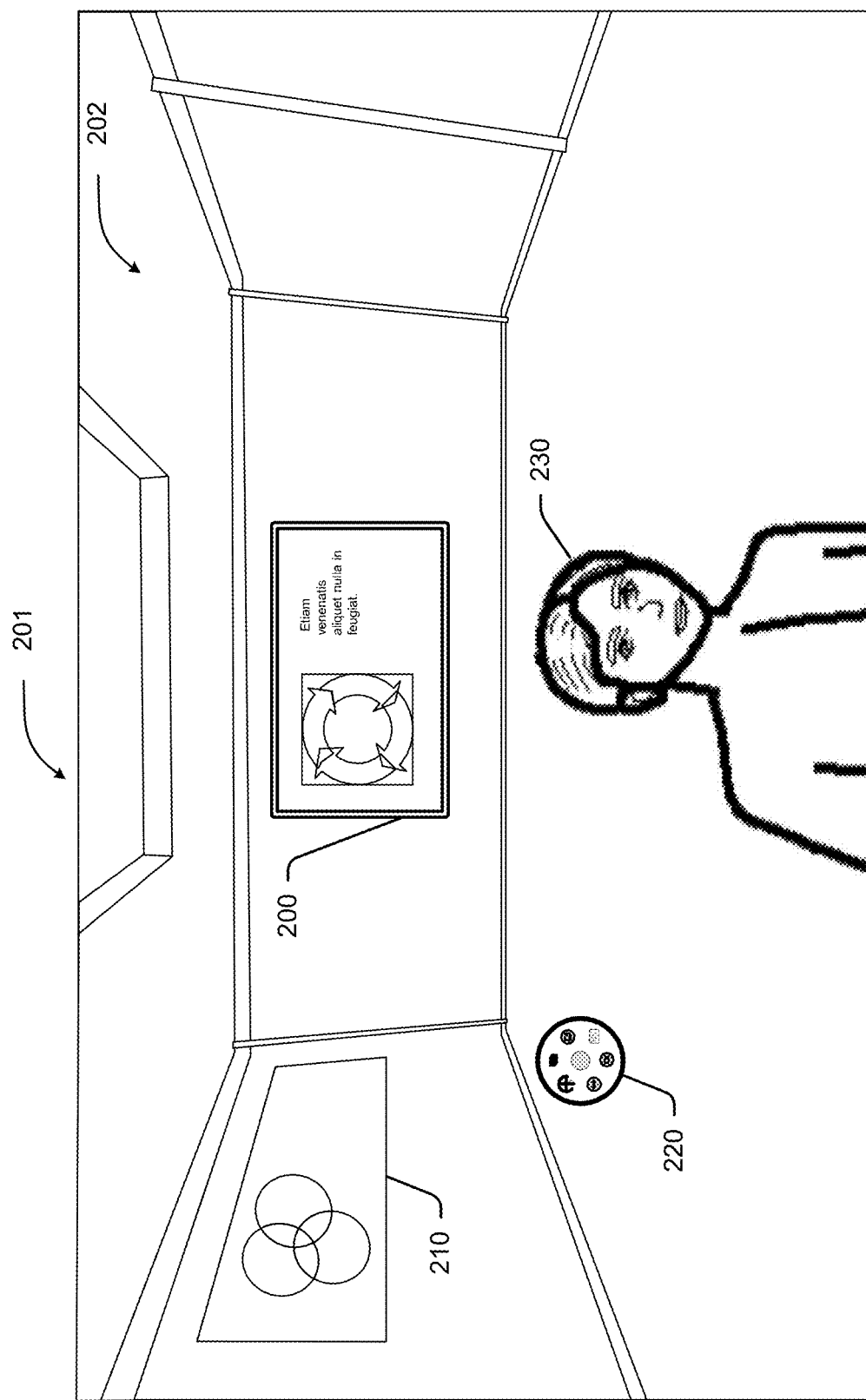
FIG. 2 illustrates an example display, according to one embodiment disclosed herein.

FIG. 2 is a UI diagram showing aspects of an example UI 201 that enables computationally efficient interaction with a 3D representation of a real-world environment 202, according to one embodiment disclosed herein. The UI 201 may correspond to an UI rendered on interactive display 150 of FIG. 1. As discussed briefly above, the technologies disclosed herein can be utilized in conjunction with an application program that provides functionality for holding networked meetings. The UI 201 presented by such an application is shown in FIGS. 2-17 and described below.

UI 201 may include a rendering of real-world environment 202 generated by, for example, the computing device 102 or VR device 103 of FIG. 1. In this manner, a user of the computing device 102 or VR device 103 can see the view of the real-world environment 202 along with whiteboard 210, display 200, and participant 230. A control interface 220 can also be presented that allows for interaction with the UI 201.

Figure 3:
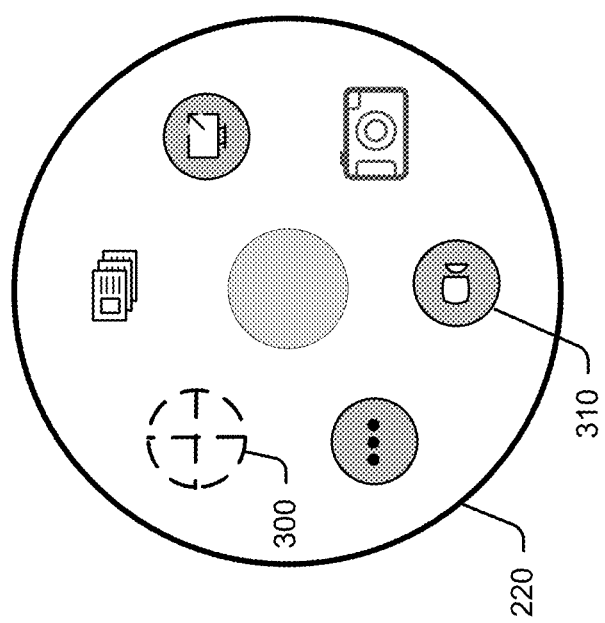
FIG. 3 illustrates an example user control according to one embodiment disclosed herein.
Figure 4:
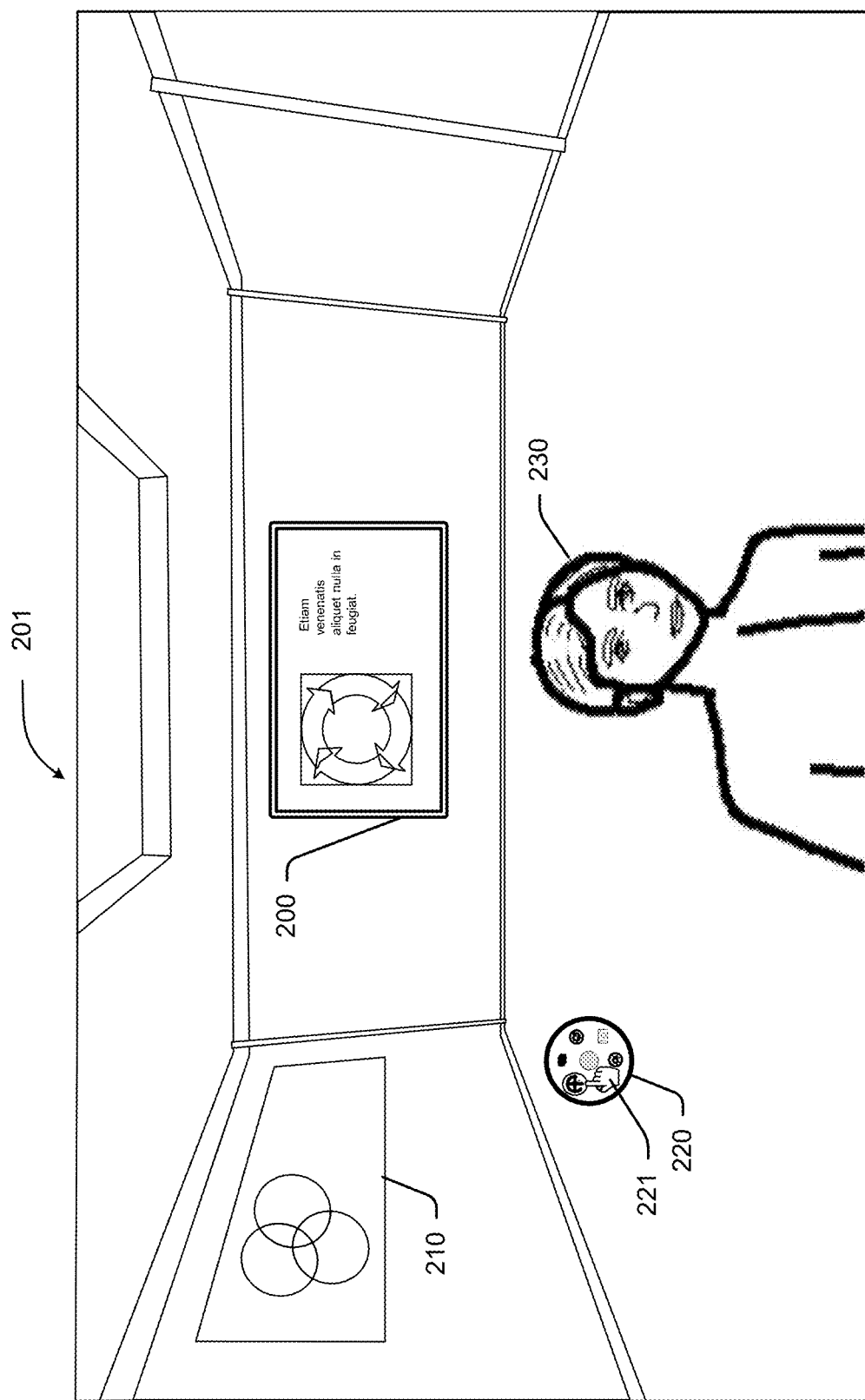
FIG. 4 illustrates an example display, according to one embodiment disclosed herein.

Further detail of control interface 220 is illustrated in FIG. 3. In one embodiment, the control interface 220 may comprise a circular wheel with selectable options 310. In one example, selectable option 300 may be configured to cause placement of a zoom window in UI 201. While the illustrated control interface 220 is shown as a circular wheel in this example, the interface can be implemented to various forms such as a rectangular list of options, a drop down menu, and other forms.

Figure 5:
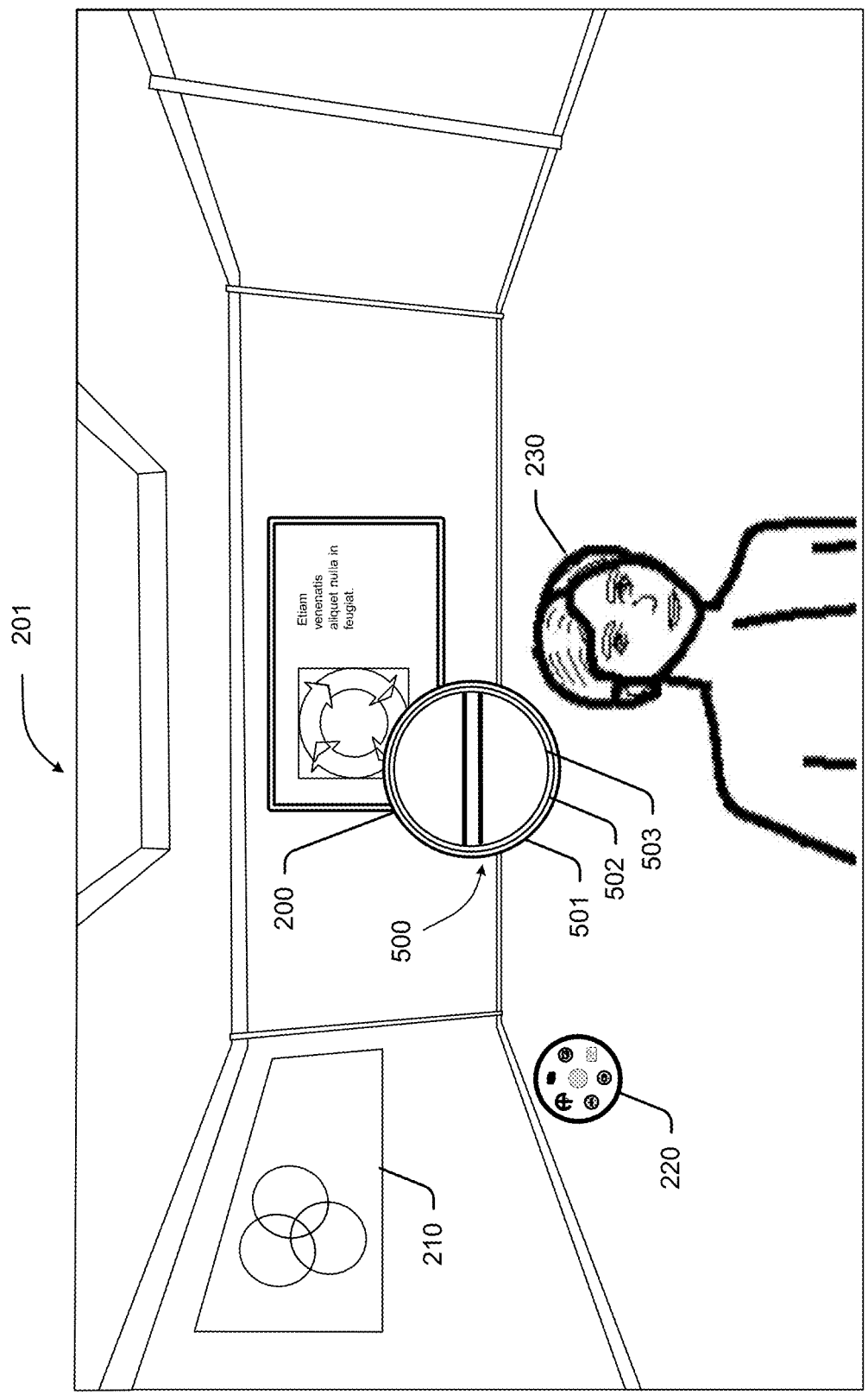
FIG. 5 illustrates an illustrative display with a zoom window, according to one embodiment disclosed herein.

A user can interact with the UI 201 utilizing mouse input, touch input, or other types of input. In the example shown in FIG. 4, for instance, the user has moved a mouse cursor 221 over the UI control 220 in order to initiate the placement of a zoom window 500 as illustrated in FIG. 5. When the user completes the selection action using the mouse button, the zoom window 500 is rendered on UI 201 at a specified location, at a previous location, or in a default location. In FIG. 5, zoom window 500 is illustrated as being proximate to display 200, and the zoom window 500 is shown rendering zoomed detail for a bottom portion of display 200. In some embodiments, the zoom window 500 may include a plurality of selective rings or areas 501, 502, and 503 that can each be associated with a function or action. For example, ring 501 may be associated with a repositioning function, ring 502 may be associated with a resizing function, and ring 503 may be associated with additional menu options.

Figure 6A:
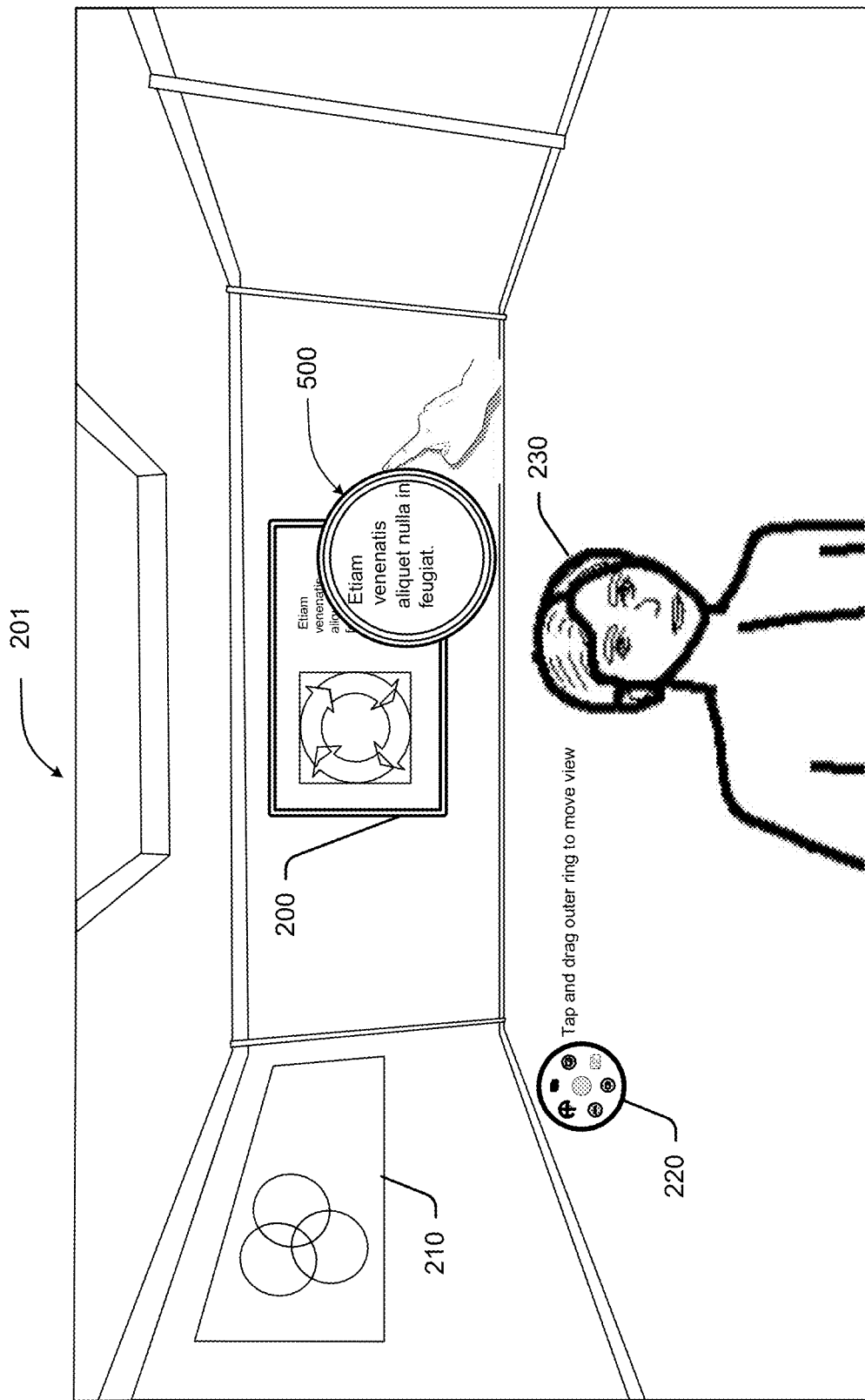
FIG. 6A illustrates an illustrative display with a repositioned zoom window, according to one embodiment disclosed herein.

In an embodiment illustrated in FIG. 6A, the user can tap and drag the outer ring (or other ring that is associated with this function) of zoom window 500 and move the location of the zoom window 500. In one embodiment, the zoom scale of content within zoom window 500 may remain unchanged as the zoom window 500 is repositioned. As shown in FIG. 6A, the zoom window 500 has been repositioned to the right side of the display 200, and the contents of zoom window 500 are now rendering the text portion of the current content that is being rendered on display 200. The available imaging data, such as from cameras available as an image source, may be used to provide the highest possible fidelity for the content within zoom window 500 as it is repositioned. For example, if the rendered environment 201 is generally provided with multiple camera sources positioned in various locations within the rendered environment, the content of the zoom window 500 may use a different camera source to provide the best available fidelity as the position of zoom window 500 is changed.

Figure 6B:
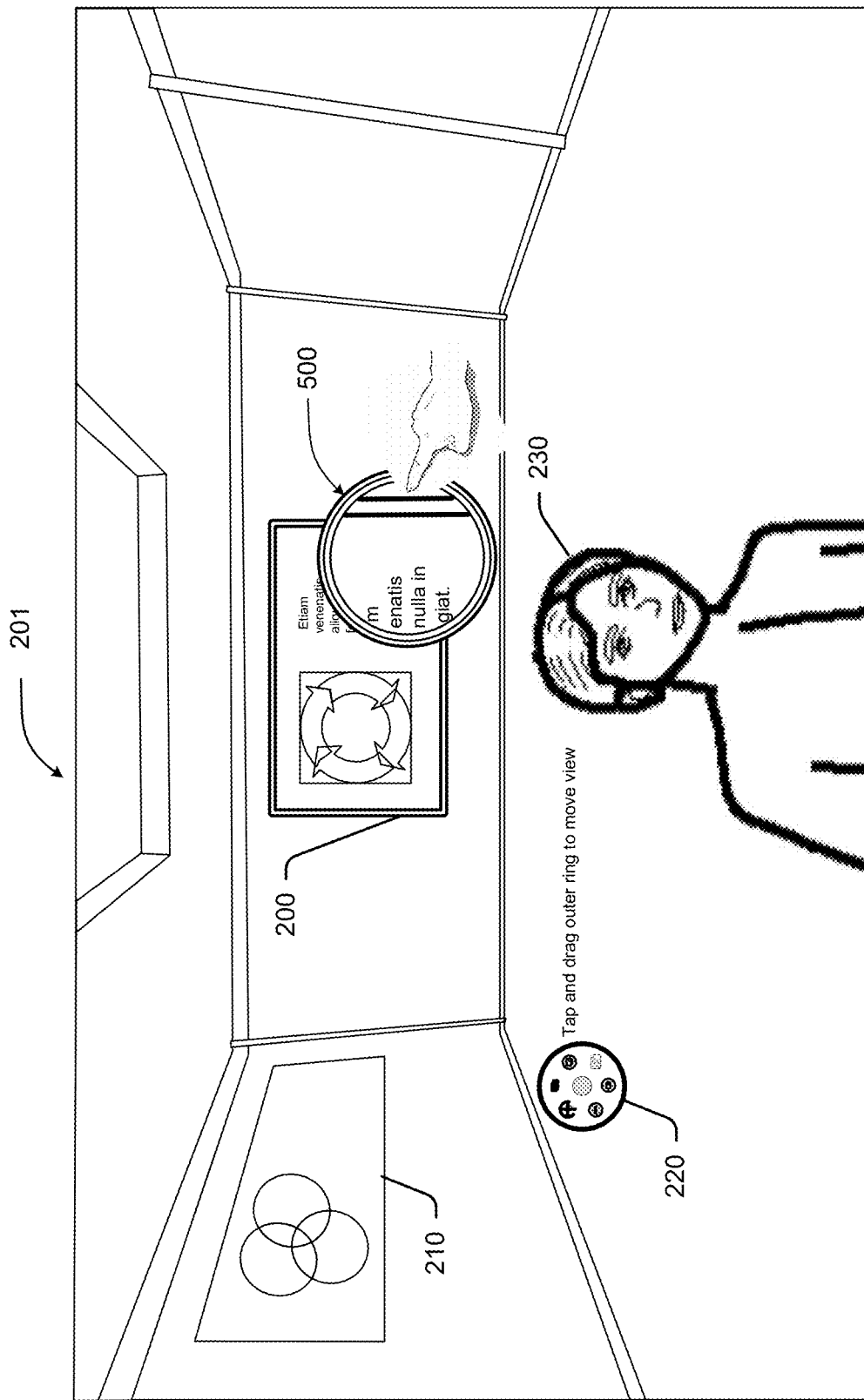
FIG. 6B illustrates an illustrative display with a repositioned zoom window, according to one embodiment disclosed herein.
Figure 7:
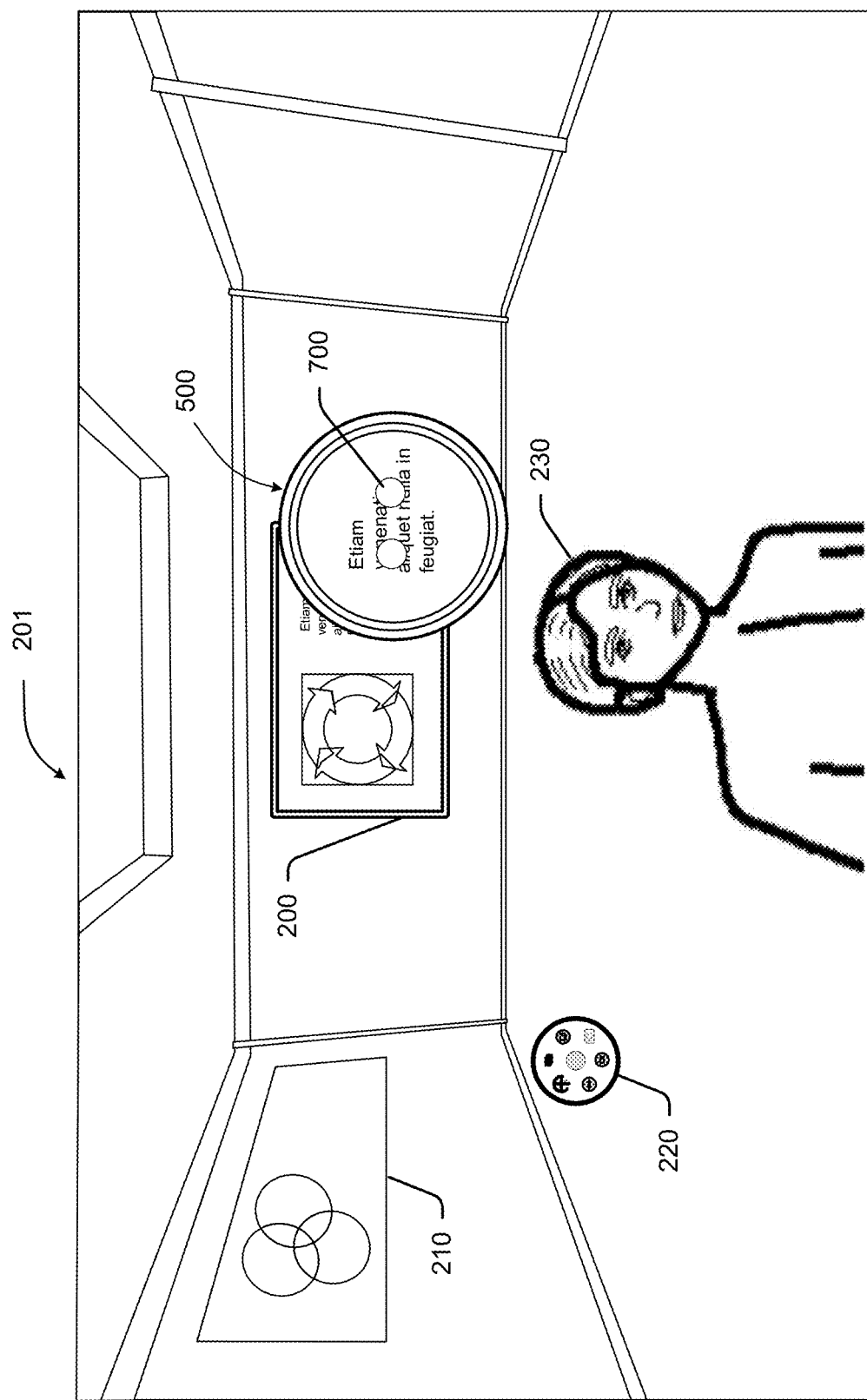
FIG. 7 illustrates an illustrative display with a modified zoom window, according to one embodiment disclosed herein.

In some embodiments, the user may pan the contents within the zoom window 500 without resizing the window or changing the zoom scale. In an embodiment illustrated in FIG. 6B, the user can input a panning gesture by touching an area within the zoom window 500 and sliding the user's finger in a selected direction. As shown in FIG. 6B, the user has panned toward the right side of the display 200. In some embodiments, the user may rotate the contents within the zoom window 500 without resizing the window or changing the zoom scale. In an embodiment illustrated in FIG. 6B, the user can input a rotating gesture by touching an area within the zoom window 500 turning the user's finger in a selected rotational direction. The available imaging data, such as from cameras available as an image source for the rendered environment, may be used to provide the highest possible fidelity for the panned content within zoom window 500. For example, if the rendered environment 201 is generally provided with a 1K camera source but a 4K camera is available, the content of the zoom window 500 may use the 4K camera source to provide more clarity as contents of zoom window 500 are panned.

In some embodiments, the user may change the zoom scale factor within the zoom window 500 without resizing the window. In an embodiment illustrated in FIG. 7, the user can input a pinch gesture by touching the zoom window 500 at two points 700 and changing the distance between the two points 700 to change the zoom scale factor within zoom window 500. In one embodiment, the size of zoom window 500 may remain unchanged as the zoom scale within zoom window 500 is changed. The available imaging data, such as from cameras available as an image source for the rendered environment, may be used to provide the highest possible fidelity for the magnified content within zoom window 500. For example, if the rendered environment 201 is generally provided with a 1K camera source but a 4K camera is available, the content of the zoom window 500 may use the 4K camera source to provide more clarity as contents of zoom window 500 are magnified.

Figure 8:
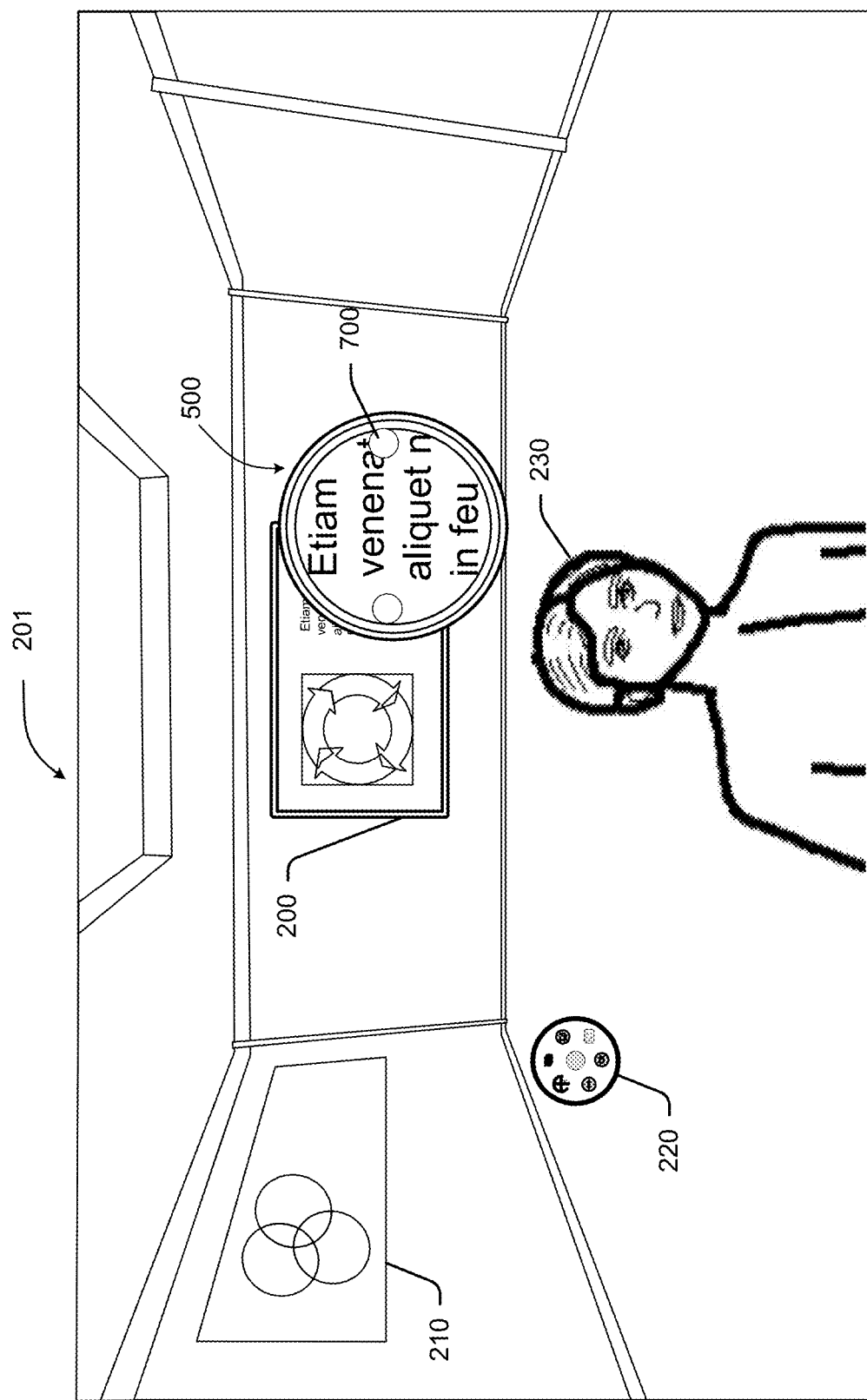
FIG. 8 illustrates an illustrative display with a modified zoom window, according to one embodiment disclosed herein.

As shown in FIG. 8, the distance between the two points 700 have increased and the zoom scale factor within zoom window 500 has increased while the size of zoom window 500 has remain unchanged.

Figure 9A:
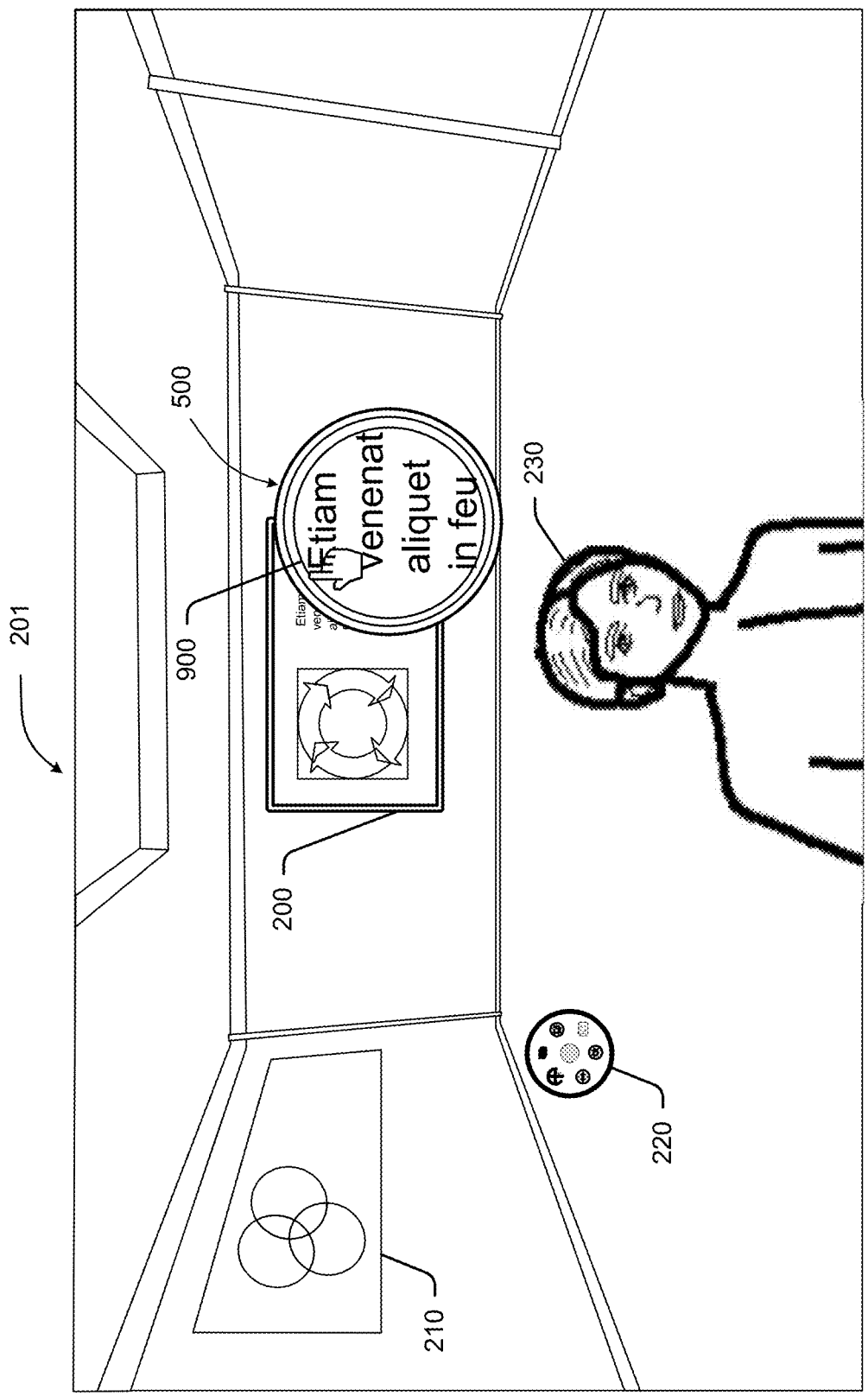
FIG. 9A illustrates an illustrative display with a selected zoom window, according to one embodiment disclosed herein.
Figure 9B:
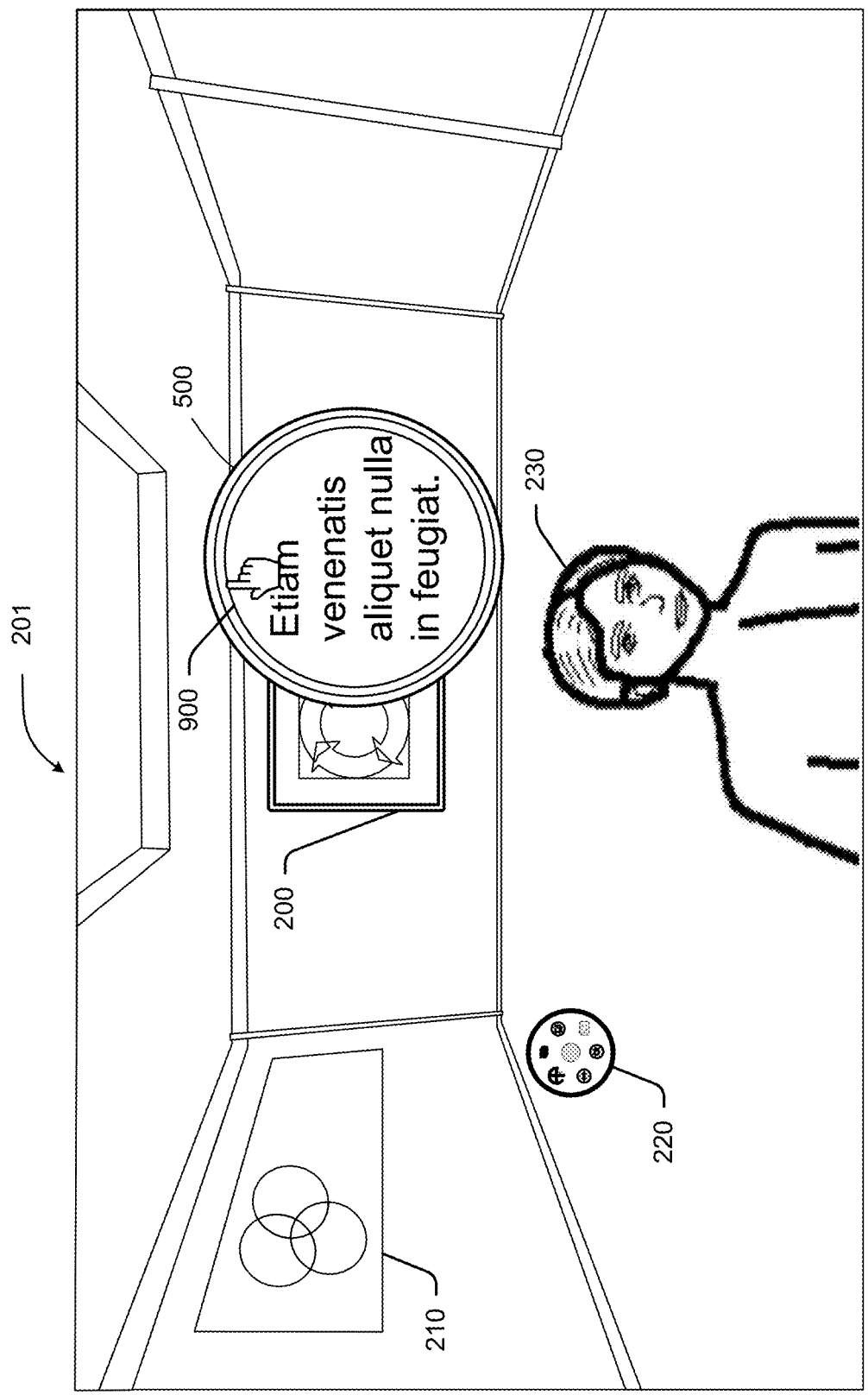
FIG. 9B illustrates an illustrative display with a selected zoom window, according to one embodiment disclosed herein.

In an embodiment illustrated in FIG. 9A, the user can input a touch gesture by touching the zoom window 500 such as at an inner ring 900 and changing the size of the zoom window 500. In one embodiment, the user may expand outwards or inwards after touching ring 900 to resize the window. As shown in FIG. 9B, the user has enlarged the size of zoom window 500. Zoom window 500 thus displays more zoomed content, without changing the zoom scale. In other embodiments, the user may use other input actions to resize the window. For example, the zoom window 500 may have resizing anchor points that the user can select and expand to resize the window. In one embodiment, the zoom scale of content within zoom window 500 may remain unchanged as the zoom window 500 is resized. The available imaging data, such as from cameras available as an image source, may be used to provide the highest possible fidelity for the content within zoom window 500 as it is resized. For example, if the rendered environment 201 is generally provided with multiple camera sources positioned in various locations within the rendered environment, the content of the zoom window 500 may use a different camera source to provide the best available fidelity as the size of zoom window 500 is changed.

Figure 10:
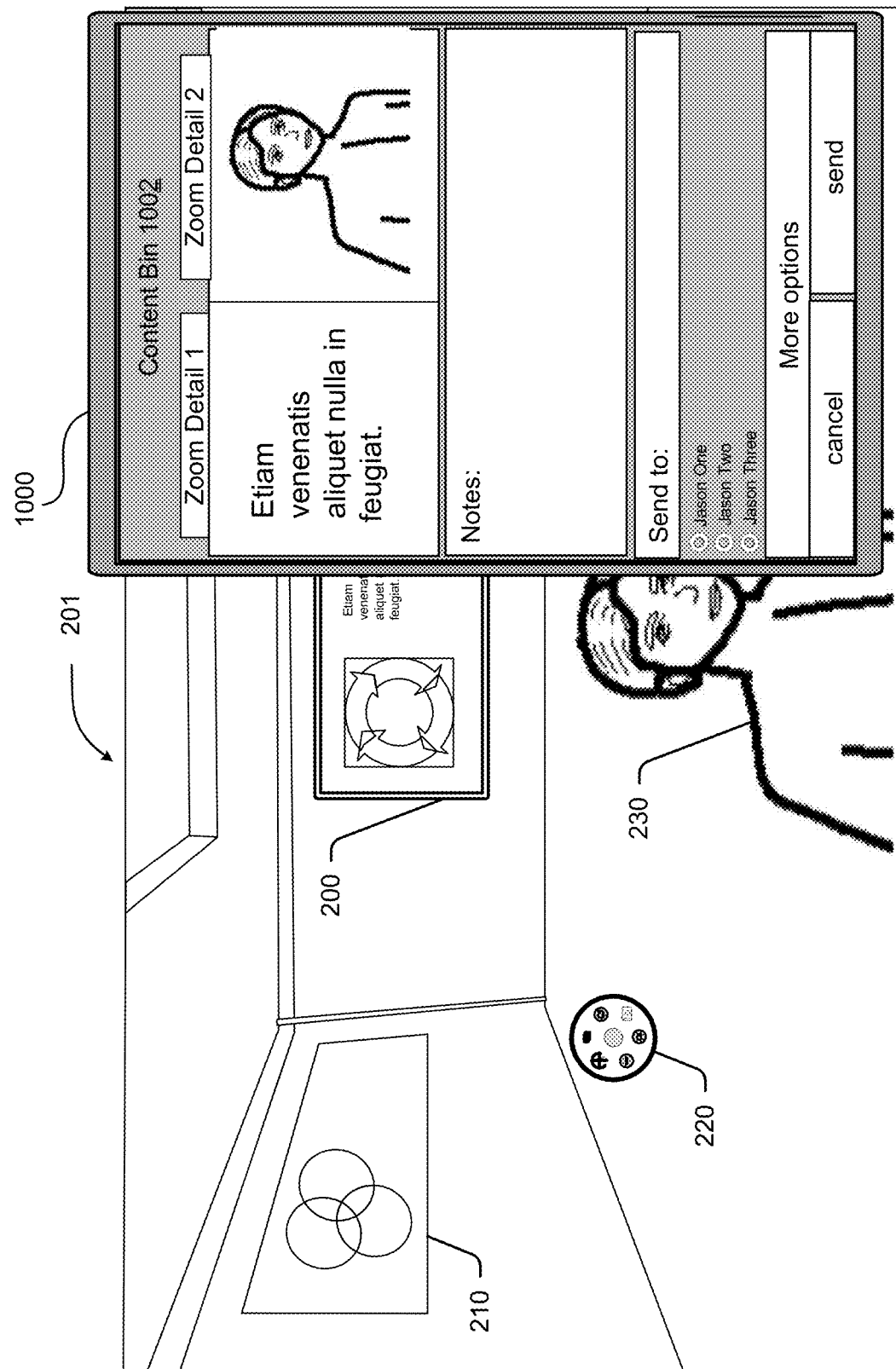
FIG. 10 illustrates an illustrative display with an editing window, according to one embodiment disclosed herein.

Additional controls can also be provided. For example, as illustrated in FIG. 10, the UI 201 can also include UI editing window 1000 for controlling aspects of the networked meeting such as, but not limited to, initiating or ending a networked meeting, sharing content with other participants in the networked meeting, changing a capture device, and selecting and editing content that is being presented at the networked meeting. Other UI controls can be provided on editing window 1000 in other embodiments.

As also illustrated in FIG. 10, the editing window 1000 can also include UI controls for performing other tasks relating to the networked meeting. For example, and without limitation, the UI editing window 1000 can provide functionality for showing notifications, showing a list of users and associated chat sessions, showing available groups or teams of users, showing the meetings during a day or other time period, and showing any recently shared or used files. Other UI controls for performing other types of functionality can be provided in other embodiments. In the example shown in FIG. 10, the UI control window 1000 includes two zoom details within content bin 1002, one of which displays the contents of the zoom window 500 from FIGS. 3 through 9B, indicated by zoom detail 1. Zoom detail 2, in this example, depicts an image of participant 230. In an embodiment, the user may annotate the captured image with notes. The user may also send a captured image to one or more recipients.

Figure 11:
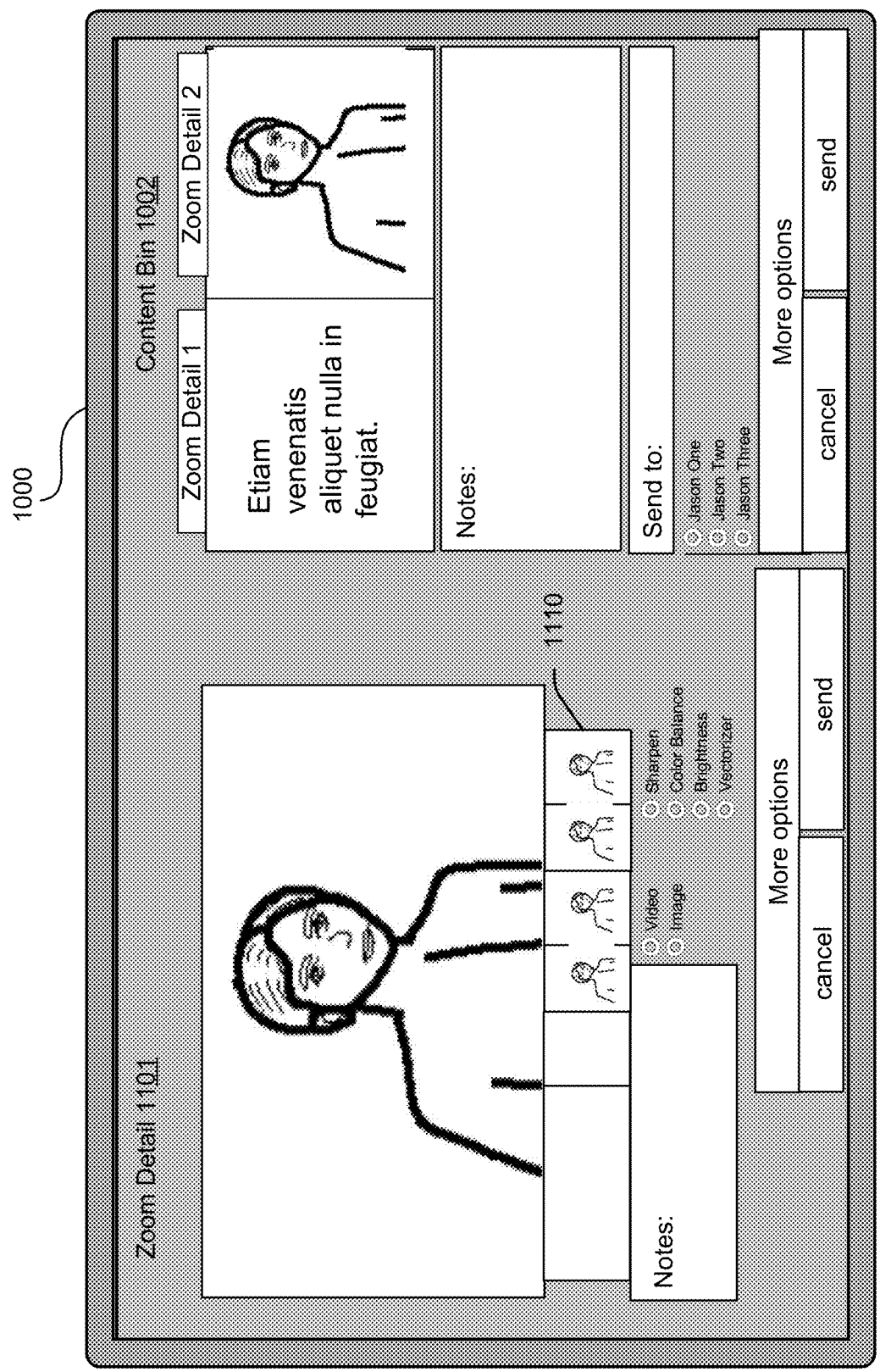
FIG. 11 illustrates an illustrative display with an editing window, according to one embodiment disclosed herein.

As illustrated in FIG. 11, the UI 1000 can be expanded to provide additional UI controls for performing other tasks relating to the rendered networked meeting. For example, the UI editing window 1000 can be expanded, as illustrated in FIG. 11, and provide, in addition to the two zoom details of content bin 1002, additional zoom detail 1101 which in this example shows greater detail for zoom detail 2 of content bin 1002. In one embodiment, the user may tag the content as video or as an image still. The editing window 1000 may provide access to various filter effects and other menu tools. For example, the editing window 1000 may allow the user to make further changes to the selected image by choosing file type, sharpen the image, change the color balance, change the brightness, and vectorize the image, to name a few examples. In an embodiment, the user may be provided a timeline 1110 to move forward and backward from the current time of the captured content that is rendered in zoom detail 1101. For example, an image may be associated with a default time window such as 30 seconds. The timeline 1110 for editing window 1000 may provide the option to traverse the timeframe during which the activity occurred and was recorded. In this way, the user may view various times of the activity, from the perspective of the zoom window 500, and further be provided various editing options over the timeframe. In some embodiments, the time windows can be synchronized with intelligent transcripts, chat histories, and recordings. At any particular time stamp, the user may be provided with other activities that are associated with that timestamp.

Figure 12:
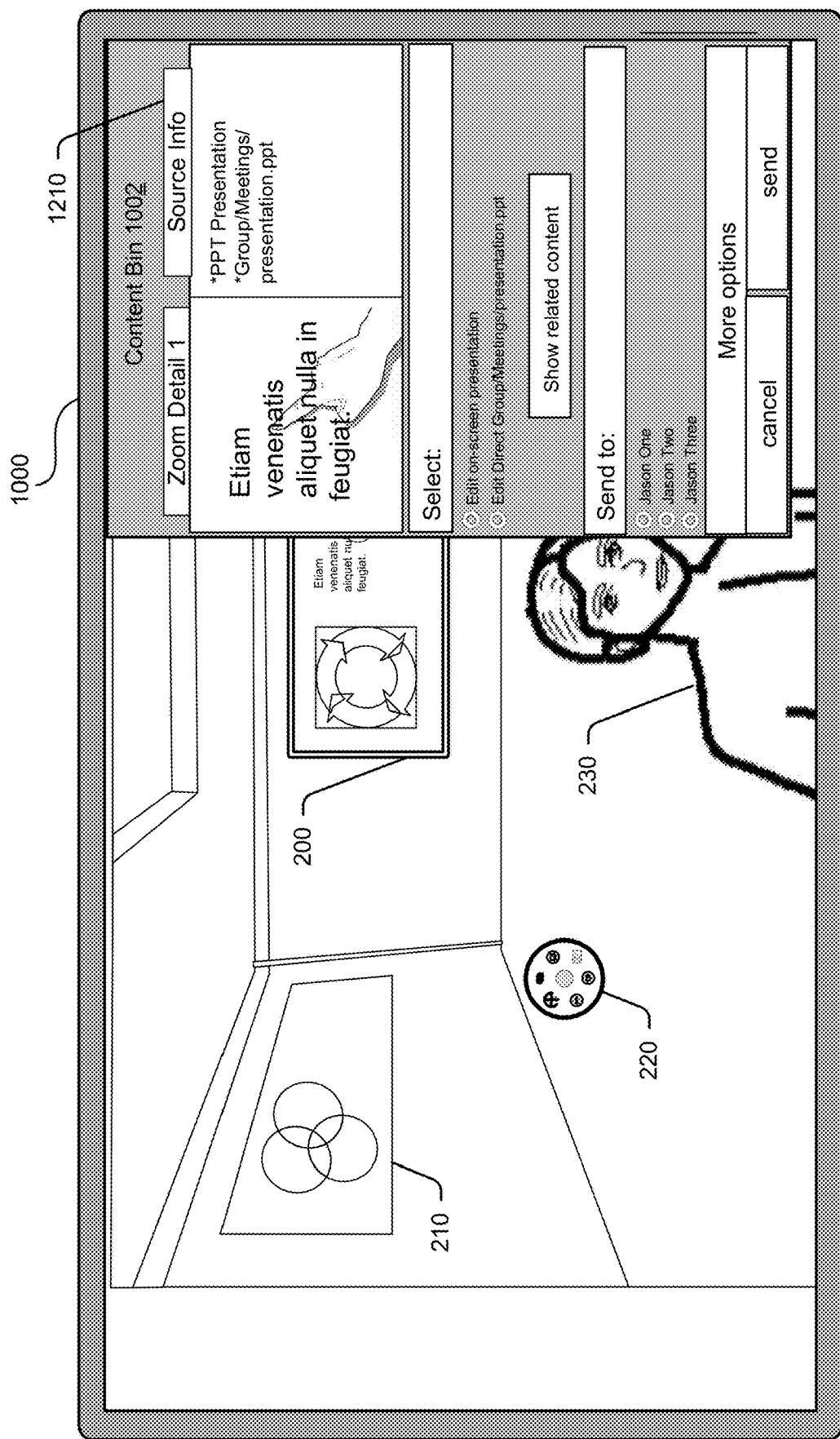
FIG. 12 illustrates an illustrative display with an editing window, according to one embodiment disclosed herein.
Figure 13:
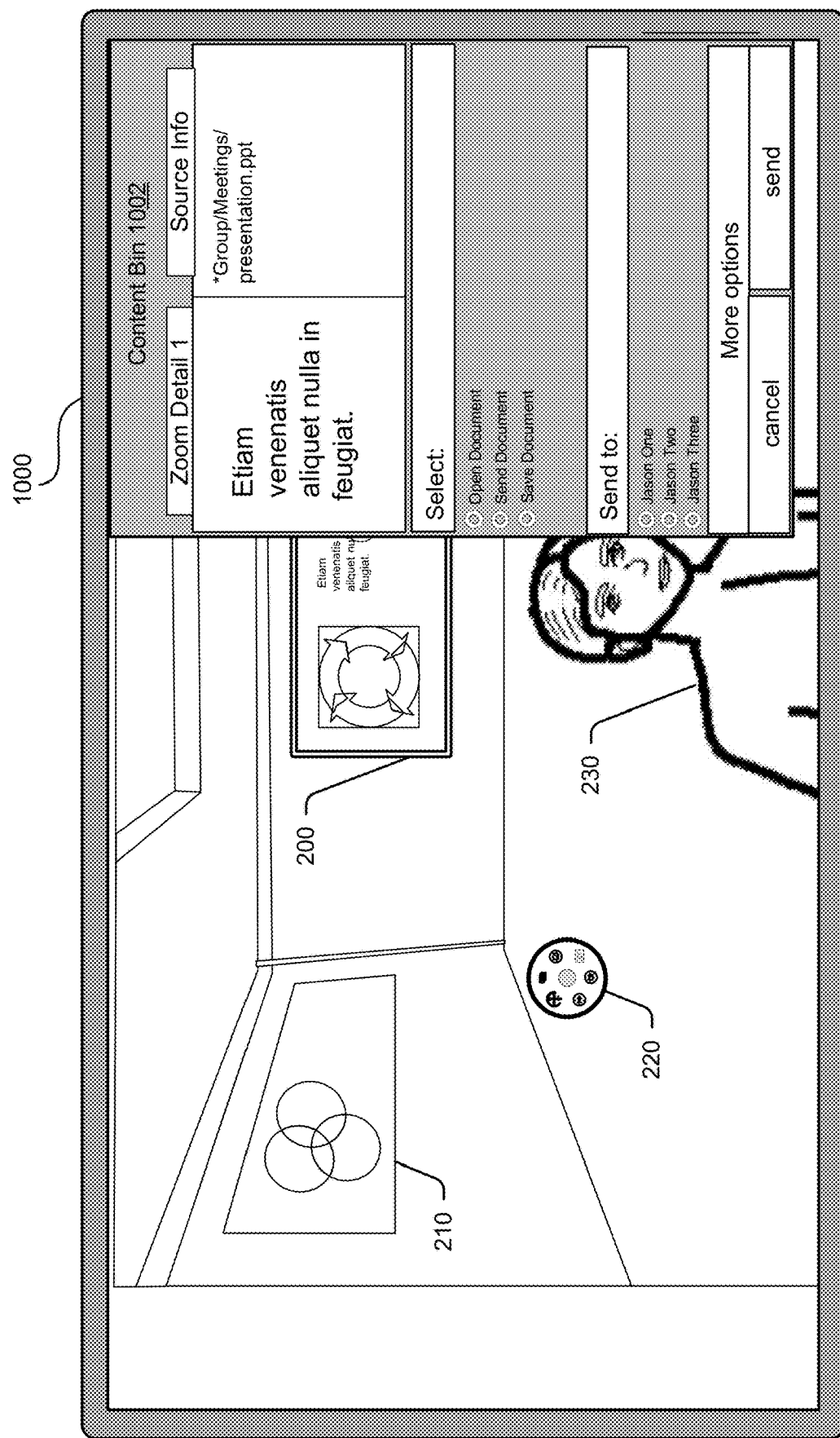
FIG. 13 illustrates an illustrative display with an editing window, according to one embodiment disclosed herein.

Referring to FIG. 12, the viewing and editing tool 1000 may facilitate detection of the source of content or an object that is being rendered. In one example, the user may select the content of zoom detail 1. The source object may be a document that can be identified, searched for, accessed, and downloaded by the user. For example, the currently rendered slide on display 200 may be used to identify a source file of the underlying presentation. As shown in the Source Info window 1210, information for the source document is shown. The user may also be provided the option to use the on-screen content if the user wishes to edit and manipulate the currently rendered image and not the source document. The user may further be provided an option of searching for additional or related content. As shown in FIG. 13, if the user selects the source document (Group/Meetings/presentation.ppt in this example), then content bin 1002 provides additional options that are available for the source document, such as opening the document, sending the document, and saving the document.

Figure 14:
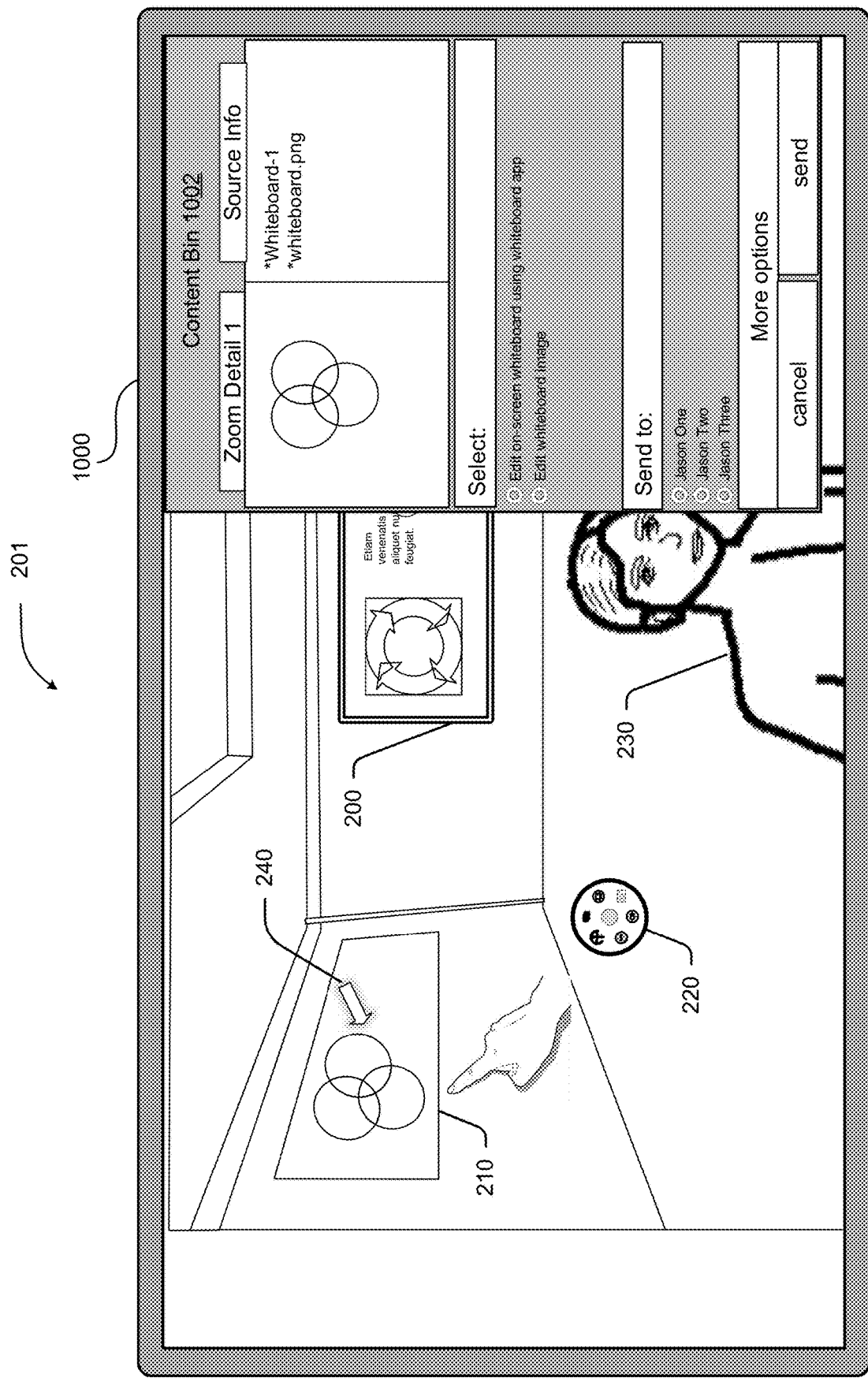
FIG. 14 illustrates an illustrative display with an editing window, according to one embodiment disclosed herein.

Referring to FIG. 14, the viewing and editing tool 1000 may facilitate remote interaction with a device that is depicted in the UI 201. In one example, the user may select the whiteboard object 210. The device may be identified, and the user may be provided an option, if authorized to control or provide input to the device, to perform actions such as inputting annotations to the whiteboard. In some embodiments, a virtual whiteboard or a whiteboard app may be instantiated and rendered that can be edited by the participants via the viewing and editing tool 1000. If the device is a camera, the user may be provided the ability to change the focus of the camera or other parameters of the camera. As shown in the content bin 1002 window, the source information is shown which includes the whiteboard device as well as the content that is rendered on the whiteboard device. In some embodiments, the user may also be provided the option to edit the on-screen whiteboard content. As shown in FIG. 14, content bin 1002 provides additional options such as controlling the whiteboard and/or editing the image on the whiteboard or editing the whiteboard image independently of what is currently rendered within the whiteboard.

In some embodiments, the editing tool 1000 may facilitate the formation of additional groups and meetings. For example, a number of participants may form breakout meeting to discuss a specific topic and then rejoin the larger group.

Figure 15:
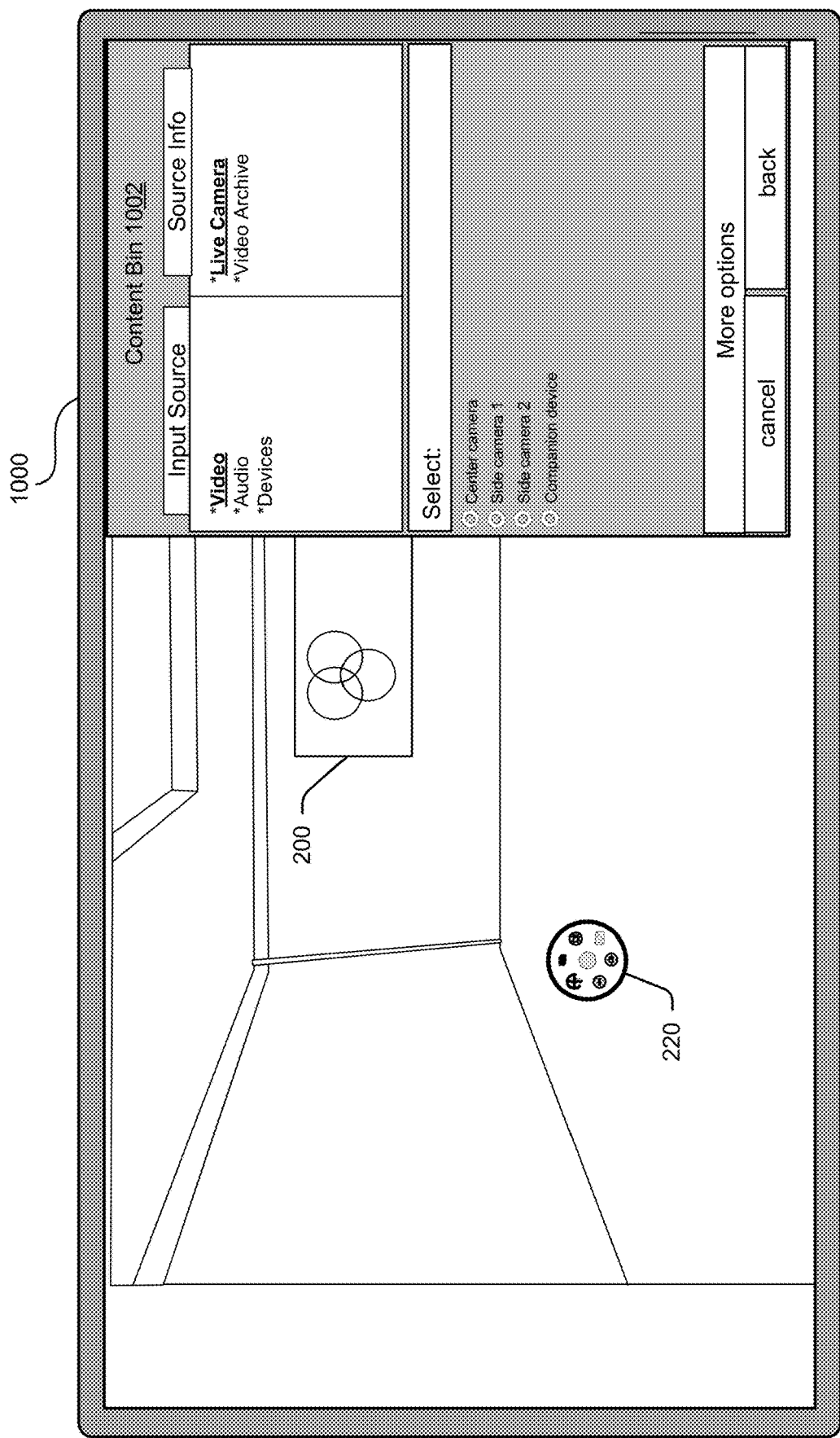
FIG. 15 illustrates an illustrative display with a changed view, according to one embodiment disclosed herein.

Referring to FIG. 15, when multiple video sources are available, the viewing and editing tool 1000 may allow selection of different perspectives of the rendered environment. For example, the user may be able to view and select cameras for the video feed (for example, cameras 111A or 111B of FIG. 1). If the user is using a zoom window, then the zoom window may be automatically and persistently positioned to the same area as the perspective is changed. As shown in the example of FIG. 15, the user may select a center camera or one of two side cameras. Additionally, the user may use a companion device such as the camera on their own computing device as an input imaging device.

The viewing and editing tool 1000 may be configured to separately select and edit the audio portion of a rendered session.

Figure 16:
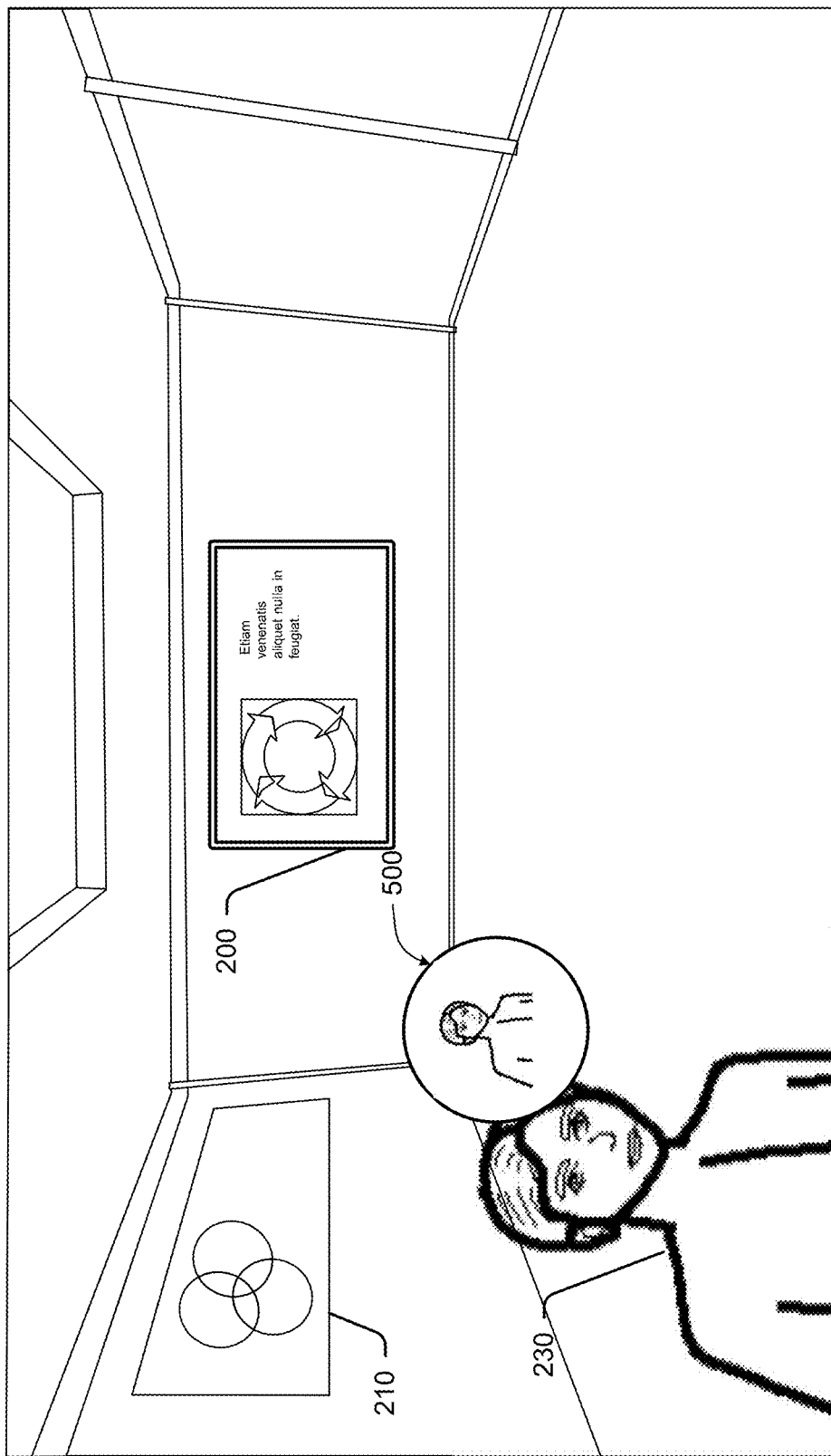
FIG. 16 illustrates an illustrative display with a zoom window, according to one embodiment disclosed herein.
Figure 17:
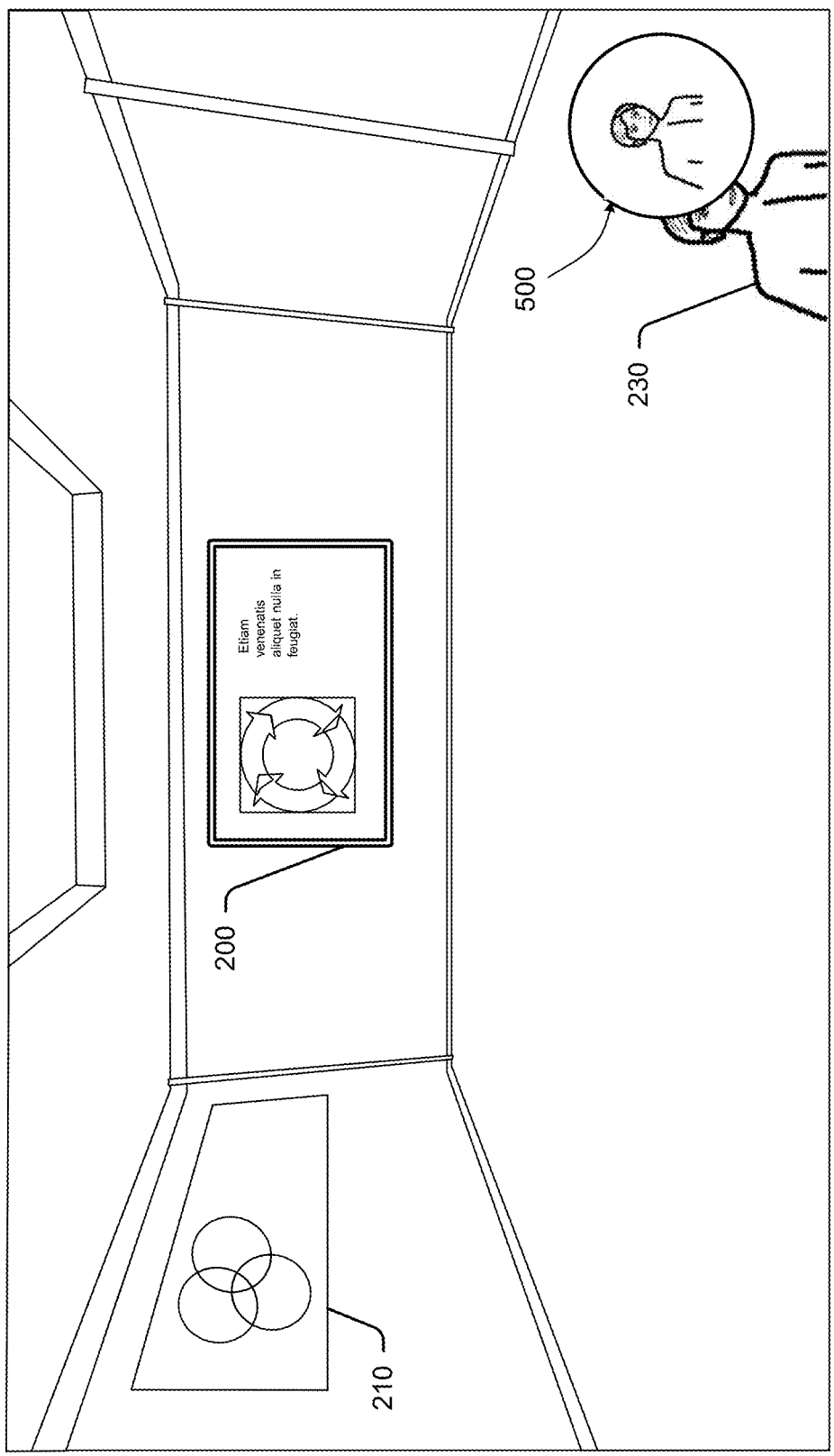
FIG. 17 illustrates an illustrative display with a zoom window, according to one embodiment disclosed herein.

Referring to FIGS. 16 and 17, the zoom window 500 is shown as being positioned proximate to participant 230. As the participant 230 moves within the rendered environment as shown in FIG. 17, in one embodiment the zoom window 500 may move as the participant moves within the rendered space. For example, the zoom window 500 may move if placed proximate to a participant who moves during the meeting. In some embodiments, the perspective of the zoom window 500 may remain constant, even if you the user changes perspective views. For example, if the user selects a different camera view which results in the environment being rendered from a different angle, the zoom window 500 may be positioned so as to continue providing a magnified view of participant 230, in this example. In some embodiments, a point of focus in the environment may be tagged and the zoom window may remain in the current location even when the perspective of the rendered environment changes. This allows the tagged activity to be continuously followed by the user.

The techniques disclosed herein can enable a user to interact with and control a 3D representation of a real-world environment based on user gestures. In some embodiments, based on the timing and direction of an input gesture, a computing device can determine a position and orientation of zoom window 500. For example, a first type of user gesture may include a short tap of a button, e.g., if a mouse button is held for less than a threshold period of time. A second type of user gesture may include a press-and-hold action, e.g., if a mouse button is held for more than the threshold period of time. Based on the detected gestures, user may be allowed to perform different actions on the zoom window 500 such as resizing, repositioning, and changing the magnification.

Although the examples described above involves an input device having a button, such as a mouse, it can be appreciated that the techniques disclosed herein can utilize any other suitable input device. For example, the techniques disclosed herein can utilize a computing device having a touchscreen. In such an implementation, once the user first selects UI control 220 for placement of the zoom window 500, the user can trace a finger or pen on a touchscreen allowing the computing device to monitor the direction of movement. When the user performs an input action, e.g., the user lifts his or her finger or pen from the touch surface or provides a voice command, the computing device can determine a position based on the location of the contact point between the touchscreen and the finger or pen. The position of the virtual object can be at the point at which the user lifted his or her finger or pen, and the orientation of the object can be based on the direction movement prior to the input action.

Figure 18:
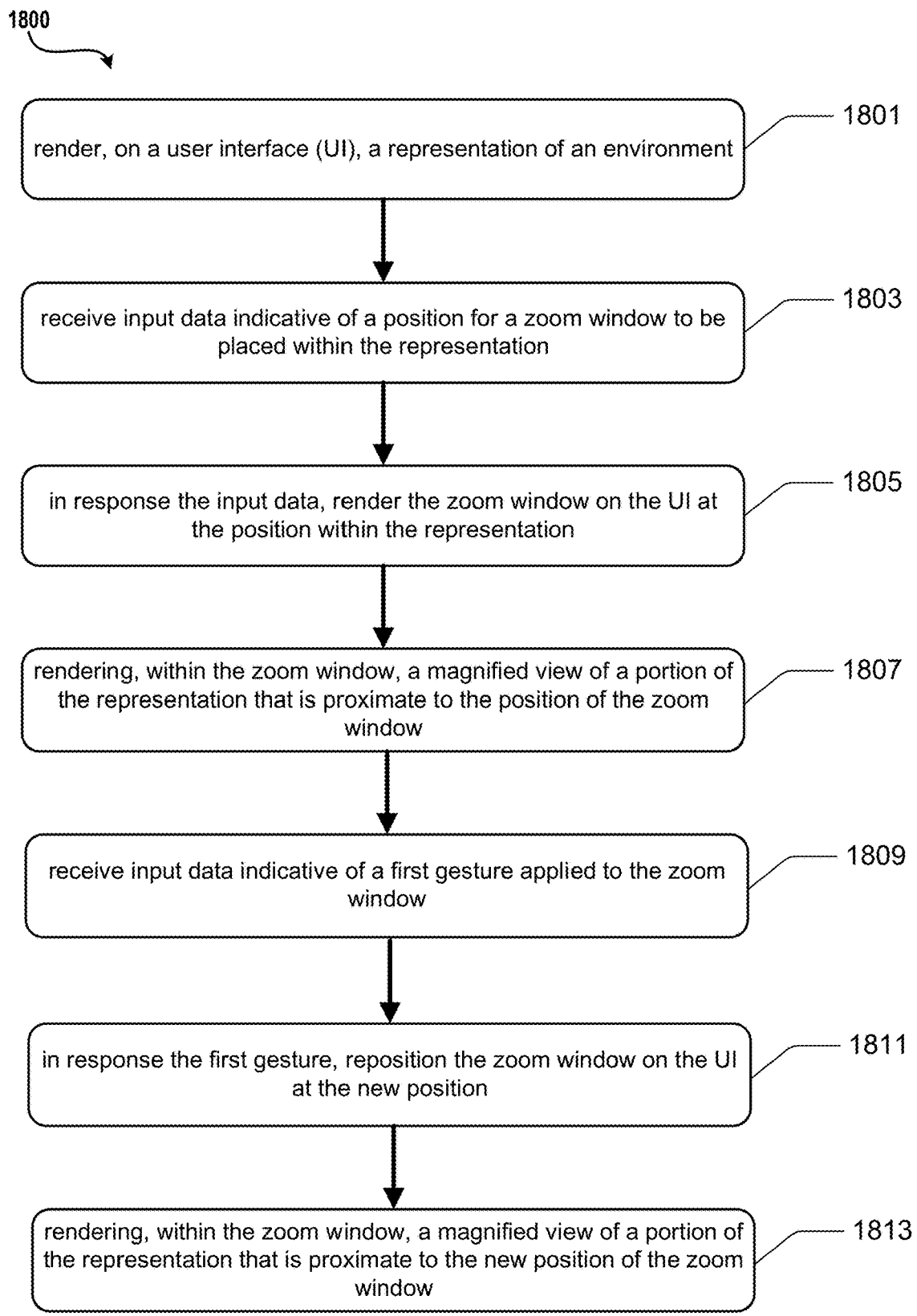
FIG. 18 illustrates aspects of a routine, according to one embodiment disclosed herein.

FIG. 18 is a diagram illustrating aspects of a routine 1800 for interacting with a rendered environment, according to one embodiment disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 18 and the other FIGS. can be implemented in association with the example presentation GUIs described above with respect to FIGS. 1 through 17. For instance, the various device(s) and/or module(s) described herein can generate, transmit, receive, and/or display data associated with content of a communication session (e.g., live content, recorded content, etc.) and/or a presentation GUI that includes images of one or more participants 30 (e.g. the user 230), avatars, channels, chat sessions, video streams, images, virtual objects, and/or applications associated with a communication session.

Referring to FIG. 18, operation 1801 illustrates rendering, on a user interface (UI), a representation of an environment, the environment indicative of an interactive communication session among a plurality of users. Operation 1801 may be followed by operation 1803. Operation 1803 illustrates receiving input data indicative of a position for a zoom window to be placed within the representation of the environment. Operation 1803 may be followed by operation 1805. Operation 1805 illustrates in response the input data, rendering the zoom window on the UI at the position within the representation, the zoom window having a size that is determined based on one or more criteria and having a plurality of selectable regions that are usable to receive user inputs. In an embodiment, the zoom window has a size that is determined based on one or more criteria. Operation 1805 may be followed by operation 1807. Operation 1807 illustrates rendering, within the zoom window, a magnified view of a portion of the representation that is proximate to the position of the zoom window. In an embodiment, the zoom window is configured to pan the magnified view in response to input received via the zoom window that is indicative of a change to the portion of the representation. Operation 1807 may be followed by operation 1809. Operation 1809 illustrates receiving input data indicative of a first gesture applied to the zoom window. In an embodiment, the first gesture is indicative of a new position for the zoom window within the representation. Operation 1809 may be followed by operation 1811. Operation 1811 illustrates in response the first gesture, repositioning the zoom window on the UI at the new position. In an embodiment, the size of the zoom window is maintained during the repositioning. Operation 1811 may be followed by operation 1813. Operation 1813 illustrates rendering, within the zoom window, a magnified view of a portion of the representation that is proximate to the new position of the zoom window. In an embodiment, the zoom window is movable to any rendered portion of the representation.

Figure 19:
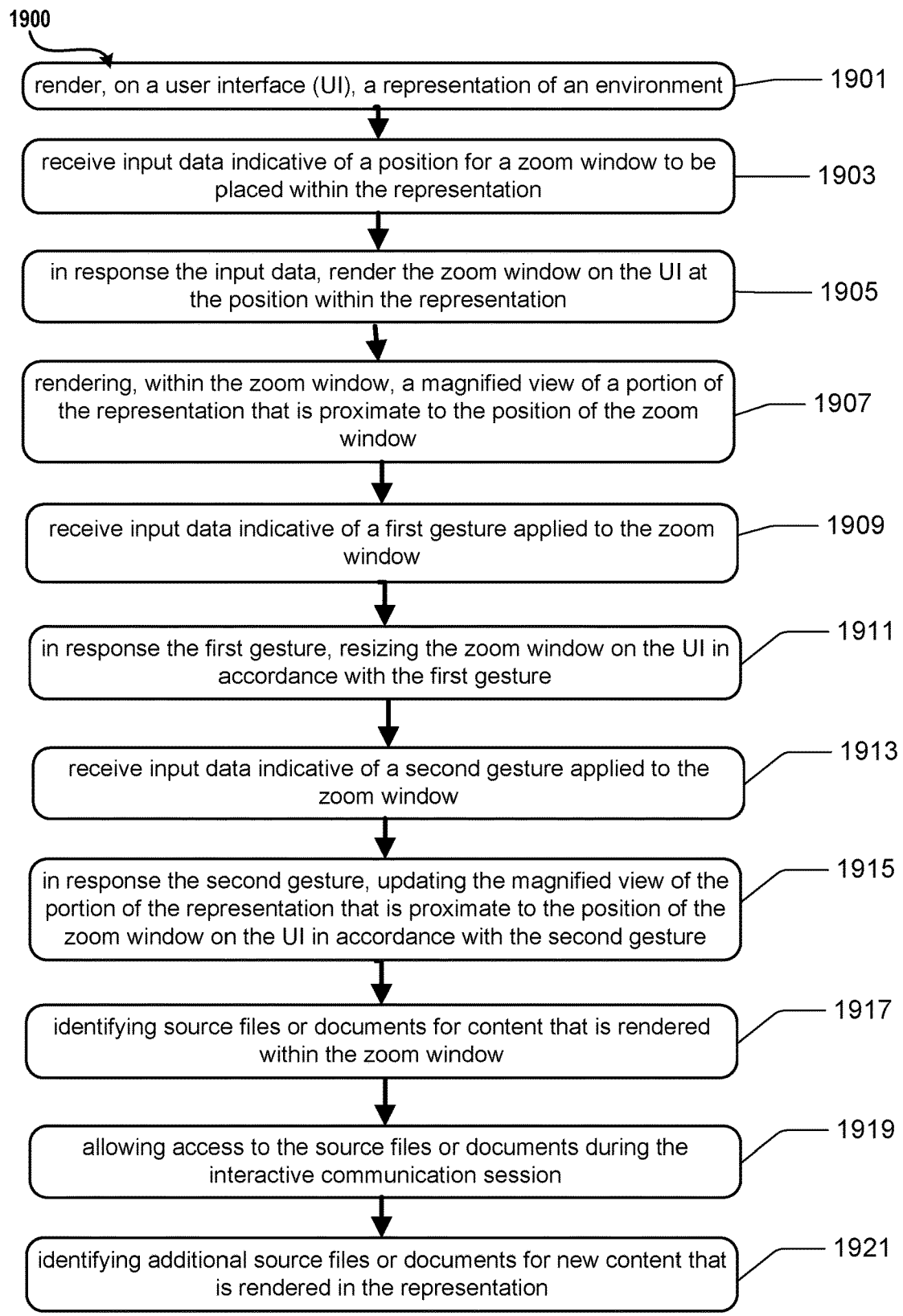
FIG. 19 illustrates aspects of a routine, according to one embodiment disclosed herein.

FIG. 19 is a diagram illustrating aspects of a routine 1900 for interacting with a rendered environment, according to one embodiment disclosed herein. Referring to FIG. 19, operation 1901 illustrates rendering a representation of an environment on a user interface (UI), the environment indicative of an interactive communication session among a plurality of users. Operation 1901 may be followed by operation 1903. Operation 1903 illustrates receiving input data indicative of a position for a zoom window to be placed within the representation. Operation 1903 may be followed by operation 1905. Operation 1905 illustrates in response the input data, rendering the zoom window on the UI at the position within the representation. In an embodiment, the zoom window has a size that is determined based on one or more criteria. Operation 1905 may be followed by operation 1907. Operation 1907 illustrates rendering, within the zoom window, a magnified view of a portion of the representation that is proximate to the position of the zoom window. Operation 1907 may be followed by operation 1909. Operation 1909 illustrates receiving input data indicative of a first gesture applied to the zoom window. In an embodiment, the first gesture is indicative of a resizing of the zoom window. Operation 1909 may be followed by operation 1911. Operation 1911 illustrates in response the first gesture, resizing the zoom window on the UI in accordance with the first gesture, wherein a scale of the magnified view within the zoom window is maintained as the zoom window is resized. Operation 1911 may be followed by operation 1913. Operation 1913 illustrates receiving input data indicative of a second gesture applied to the zoom window, the second gesture indicative of a change to a zoom scale for content within the zoom window. Operation 1913 may be followed by operation 1915. Operation 1915 illustrates in response the second gesture, updating the magnified view of the portion of the representation that is proximate to the position of the zoom window on the UI in accordance with the second gesture. In an embodiment, the size of the zoom window is maintained as the magnified view is updated. Operation 1915 may be followed by operation 1917. Operation 1917 illustrates identifying source files or documents for content that is rendered within the zoom window. Operation 1917 may be followed by operation 1919. Operation 1919 illustrates allowing access to the source files or documents during the interactive communication session. Operation 1919 may be followed by operation 1921. Operation 1921 illustrates identifying additional source files or documents for new content that is rendered in the representation.

Figure 20:
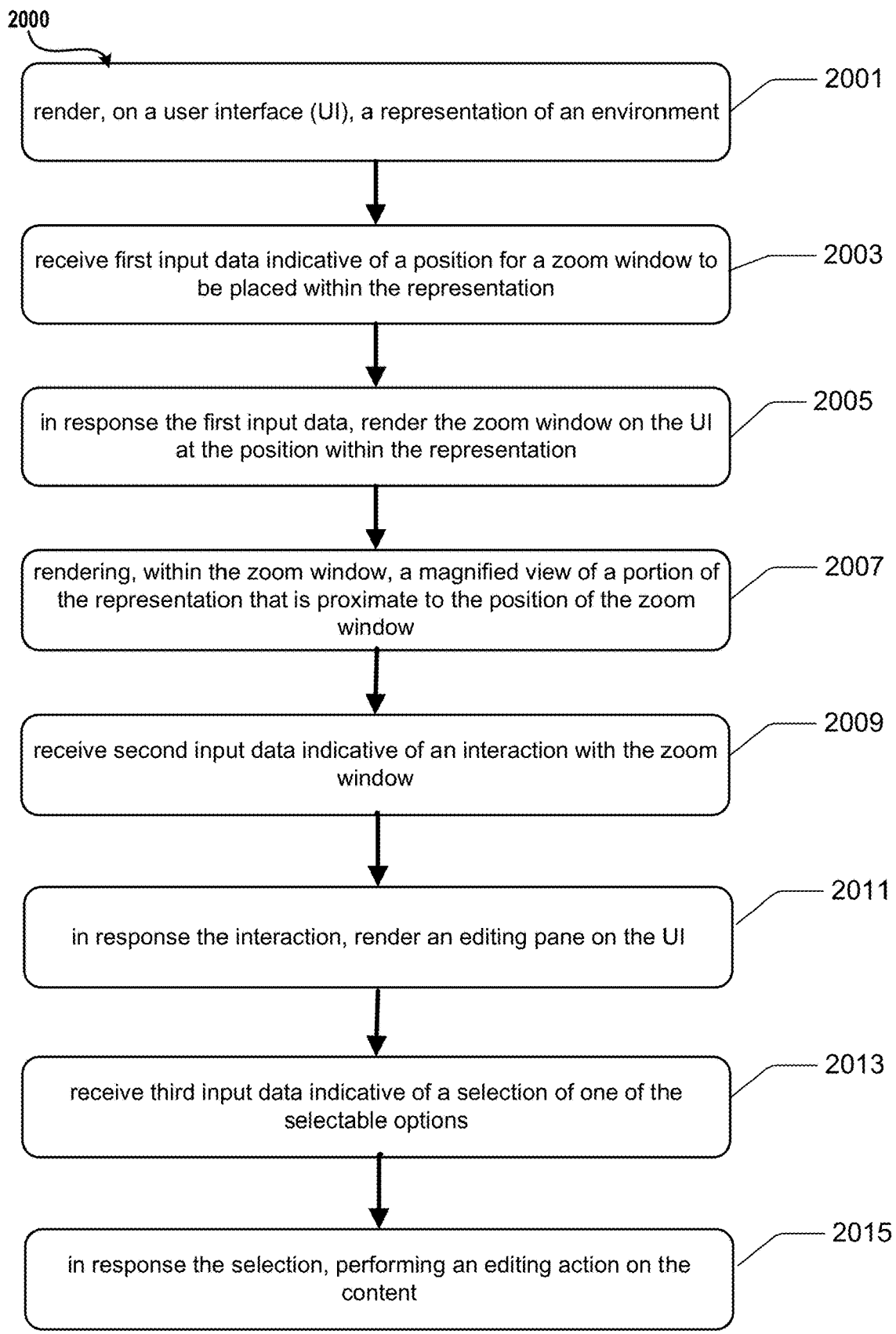
FIG. 20 illustrates aspects of a routine, according to one embodiment disclosed herein.

FIG. 20 is a diagram illustrating aspects of a routine 2000 for interacting with a rendered environment, according to one embodiment disclosed herein. Referring to FIG. 20, operation 2001 illustrates rendering, on a user interface (UI), a contemporaneous representation of an environment indicative of an interactive communication session among a plurality of users. Operation 2001 may be followed by operation 2003. Operation 2003 illustrates receiving first input data indicative of a position for a zoom window to be placed within the representation. Operation 2003 may be followed by operation 2005. Operation 2005 illustrates in response the first input data, rendering the zoom window on the UI at the position within the representation. Operation 2005 may be followed by operation 2007. Operation 2007 illustrates rendering, within the zoom window, a magnified view of a portion of the representation that is proximate to the position of the zoom window. Operation 2007 may be followed by operation 2009. Operation 2009 illustrates receiving second input data indicative of an interaction with the zoom window. Operation 2009 may be followed by operation 2011. Operation 2011 illustrates in response the interaction, rendering an editing pane on the UI. In an embodiment, the editing pane comprises a representation of content of the zoom window. Additionally, the editing pane comprises one or more selectable options for actions to be applied to the content. Operation 2011 may be followed by operation 2013. Operation 2013 illustrates receive third input data indicative of a selection of one of the selectable options. Operation 2013 may be followed by operation 2015. Operation 2015 illustrates in response the selection, performing an editing action on the content. In an embodiment, the editing pane is configured to send data indicative of the actions. The data may be usable to render a shared and contemporaneously updated view of the actions to the interactive communication session.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 21:
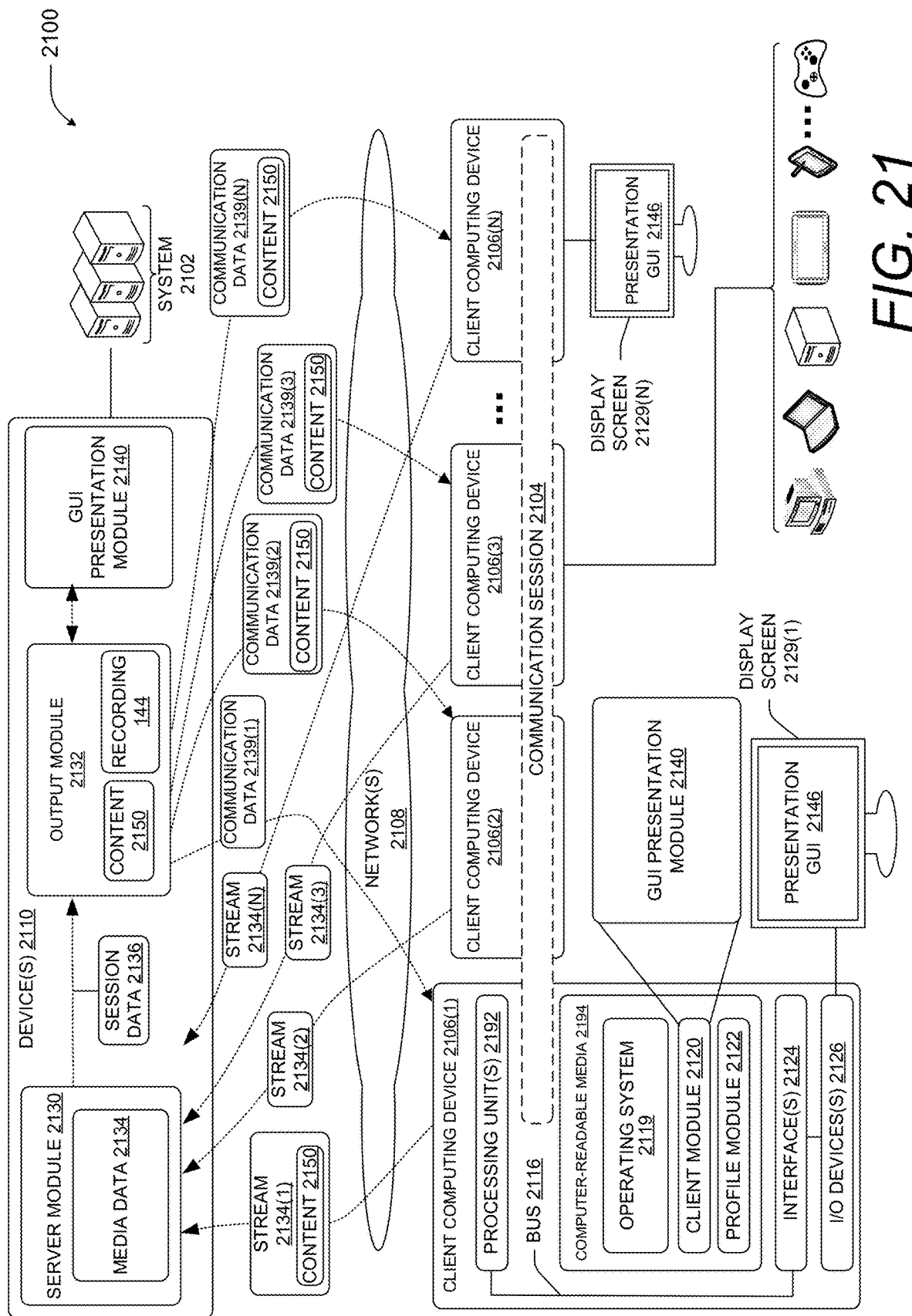
FIG. 21 is a computing system diagram showing aspects of an illustrative operating environment for the technologies disclosed herein.

FIG. 21 is a diagram illustrating an example environment 2100 in which a system 2102 can operate to populate the HCI disclosed herein with images 108, virtual objects 216, and/or other types of presentation content. In some implementations, a system implemented agent may function to collect and/or analyze data associated with the example environment 2100. For example, the agent may function to collect and/or analyze data exchanged between participants involved in a communication session 2104 linked to the GUIs disclosed herein.

As illustrated, the communication session 2104 may be implemented between a number of client computing devices 2106(1) through 2106(N) (where N is a positive integer number having a value of two or greater) that are associated with the system 2102 or are part of the system 2102. The client computing devices 2106(1) through 2106(N) enable users, also referred to as individuals, to participate in the communication session 2104.

In this example, the communication session 2104 is hosted, over one or more network(s) 2108, by the system 2102. That is, the system 2102 can provide a service that enables users of the client computing devices 2106(1) through 2106(N) to participate in the communication session 2104 (e.g., via a live viewing and/or a recorded viewing). Consequently, a "participant" to the communication session 2104 can comprise a user and/or a client computing device (e.g., multiple users may be in a communication room participating in a communication session via the use of a single client computing device), each of which can communicate with other participants. As an alternative, the communication session 2104 can be hosted by one of the client computing devices 2106(1) through 2106(N) utilizing peer-to-peer technologies. The system 2102 can also host chat conversations and other team collaboration functionality (e.g., as part of an application suite).

In some implementations, such chat conversations and other team collaboration functionality are considered external communication sessions distinct from the communication session 2104. A computerized agent to collect participant data in the communication session 2104 may be able to link to such external communication sessions. Therefore, the computerized agent may receive information, such as date, time, session particulars, and the like, that enables connectivity to such external communication sessions. In one example, a chat conversation can be conducted in accordance with the communication session 2104. Additionally, the system 2102 may host the communication session 2104, which includes at least a plurality of participants co-located at a meeting location, such as a meeting room or auditorium, or located in disparate locations.

In examples described herein, client computing devices 2106(1) through 2106(N) participating in the communication session 2104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 2104 live as activity occurs, or alternatively, via a recording at a later time after the activity occurs. In examples described herein, client computing devices 2106(1) through 2106(N) participating in the communication session 2104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 2102 includes device(s) 2110. The device(s) 2110 and/or other components of the system 2102 can include distributed computing resources that communicate with one another and/or with the client computing devices 2106(1) through 2106(N) via the one or more network(s) 2108. In some examples, the system 2102 may be an independent system that is tasked with managing aspects of one or more communication sessions such as communication session 2104. As an example, the system 2102 may be managed by entities such as SLACK, WEBEX, GOTOMEETING, GOOGLE HANGOUTS, etc.

Network(s) 2108 may include, for example, public networks such as the Internet, private networks such as an institutional and/or personal intranet, or some combination of private and public networks. Network(s) 2108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 2108 may utilize communications protocols, including packet-based and/or datagram-based protocols such as Internet protocol ("IP"), transmission control protocol ("TCP"), user datagram protocol ("UDP"), or other types of protocols. Moreover, network(s) 2108 may also include a number of devices that facilitate network communications and/or form a hardware basis for the networks, such as switches, routers, gateways, access points, firewalls, base stations, repeaters, backbone devices, and the like.

In some examples, network(s) 2108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.21 standards (e.g., 802.21g, 802.21n, 802.21ac and so forth), and other standards.

In various examples, device(s) 2110 may include one or more computing devices that operate in a cluster or other grouped configuration to share resources, balance load, increase performance, provide fail-over support or redundancy, or for other purposes. For instance, device(s) 2110 may belong to a variety of classes of devices such as traditional server-type devices, desktop computer-type devices, and/or mobile-type devices. Thus, although illustrated as a single type of device or a server-type device, device(s) 2110 may include a diverse variety of device types and are not limited to a particular type of device. Device(s) 2110 may represent, but are not limited to, server computers, desktop computers, web-server computers, personal computers, mobile computers, laptop computers, tablet computers, or any other sort of computing device.

A client computing device (e.g., one of client computing device(s) 2106(1) through 2106(N)) may belong to a variety of classes of devices, which may be the same as, or different from, device(s) 2110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 2106(1) through 2106(N) of the various classes and device types can represent any type of computing device having one or more data processing unit(s) 2112 operably connected to computer-readable media 2184 such as via a bus 2116, which in some instances can include one or more of a system bus, a data bus, an address bus, a PCI bus, a Mini-PCI bus, and any variety of local, peripheral, and/or independent buses.

Executable instructions stored on computer-readable media 2194 may include, for example, an operating system 2119, a client module 2120, a profile module 2122, and other modules, programs, or applications that are loadable and executable by data processing units(s) 2192.

Client computing device(s) 2106(1) through 2106(N) may also include one or more interface(s) 2124 to enable communications between client computing device(s) 2106(1) through 2106(N) and other networked devices, such as device(s) 2110, over network(s) 2108. Such network interface(s) 2124 may include one or more network interface controllers (NICs) or other types of transceiver devices to send and receive communications and/or data over a network. Moreover, client computing device(s) 2106(1) through 2106(N) can include input/output ("I/O") interfaces 2126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 21 illustrates that client computing device 2106(1) is in some way connected to a display device (e.g., a display screen 2128(1)), which can display a GUI according to the techniques described herein.

In the example environment 2100 of FIG. 21, client computing devices 2106(1) through 2106(N) may use their respective client modules 2120 to connect with one another and/or other external device(s) in order to participate in the communication session 2104, or in order to contribute activity to a collaboration environment. For instance, a first user may utilize a client computing device 2106(1) to communicate with a second user of another client computing device 2106(2). When executing client modules 2120, the users may share data, which may cause the client computing device 2106(1) to connect to the system 2102 and/or the other client computing devices 2106(2) through 2106(N) over the network(s) 2108.

The client computing device(s) 2106(1) through 2106(N) may use their respective profile module 2122 to generate participant profiles (not shown in FIG. 21) and provide the participant profiles to other client computing devices and/or to the device(s) 2110 of the system 2102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 21, the device(s) 2110 of the system 2102 includes a server module 2130 and an output module 2132. In this example, the server module 2130 is configured to receive, from individual client computing devices such as client computing devices 2106(1) through 2106(N), media streams 2134(1) through 2134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 2130 is configured to receive a collection of various media streams 2134(1) through 2134(N) during a live viewing of the communication session 2104 (the collection being referred to herein as "media data 2134"). In some scenarios, not all the client computing devices that participate in the communication session 2104 provide a media stream. For example, a client computing device may only be a consuming, or a "listening", device such that it only receives content associated with the communication session 2104 but does not provide any content to the communication session 2104.

In various examples, the server module 2130 can select aspects of the media streams 2134 that are to be shared with individual ones of the participating client computing devices 2106(1) through 2106(N). Consequently, the server module 2130 may be configured to generate session data 2136 based on the streams 2134 and/or pass the session data 2136 to the output module 2132. Then, the output module 2132 may communicate communication data 2138 to the client computing devices (e.g., client computing devices 2106(1) through 2106(3) participating in a live viewing of the communication session). The communication data 2138 may include video, audio, and/or other content data, provided by the output module 2132 based on content 2150 associated with the output module 2132 and based on received session data 2136.

As shown, the output module 2132 transmits communication data 2138(1) to client computing device 2106(1), and transmits communication data 2138(2) to client computing device 2106(2), and transmits communication data 2138(3) to client computing device 2106(3), etc. The communication data 2138 transmitted to the client computing devices can be the same or can be different (e.g., positioning of streams of content within a user interface may vary from one device to the next).

In various implementations, the device(s) 2110 and/or the client module 2120 can include GUI presentation module 2140. The GUI presentation module 2140 may be configured to analyze communication data 2138 that is for delivery to one or more of the client computing devices 2106. Specifically, the GUI presentation module 2140, at the device(s) 2110 and/or the client computing device 2106, may analyze communication data 2138 to determine an appropriate manner for displaying video, image, and/or content on the display screen 2128 of an associated client computing device 2106. In some implementations, the GUI presentation module 2140 may provide video, image, and/or content to a presentation GUI 2146 rendered on the display screen 2128 of the associated client computing device 2106. The presentation GUI 2146 may be caused to be rendered on the display screen 2128 by the GUI presentation module 2140. The presentation GUI 2146 may include the video, image, and/or content analyzed by the GUI presentation module 2140.

In some implementations, the presentation GUI 2146 may include a plurality of sections or grids that may render or comprise video, image, and/or content for display on the display screen 2128. For example, a first section of the presentation GUI 2146 may include a video feed of a presenter or individual, a second section of the presentation GUI 2146 may include a video feed of an individual consuming meeting information provided by the presenter or individual. The GUI presentation module 2140 may populate the first and second sections of the presentation GUI 2146 in a manner that properly imitates an environment experience that the presenter and the individual may be sharing.

In some implementations, the GUI presentation module 2140 may enlarge or provide a zoomed view of the individual represented by the video feed in order to highlight a reaction, such as a facial feature, the individual had to the presenter. In some implementations, the presentation GUI 2146 may include a video feed of a plurality of participants associated with a meeting, such as a general communication session. In other implementations, the presentation GUI 2146 may be associated with a channel, such as a chat channel, enterprise teams channel, or the like. Therefore, the presentation GUI 2146 may be associated with an external communication session that is different than the general communication session.

Figure 22:
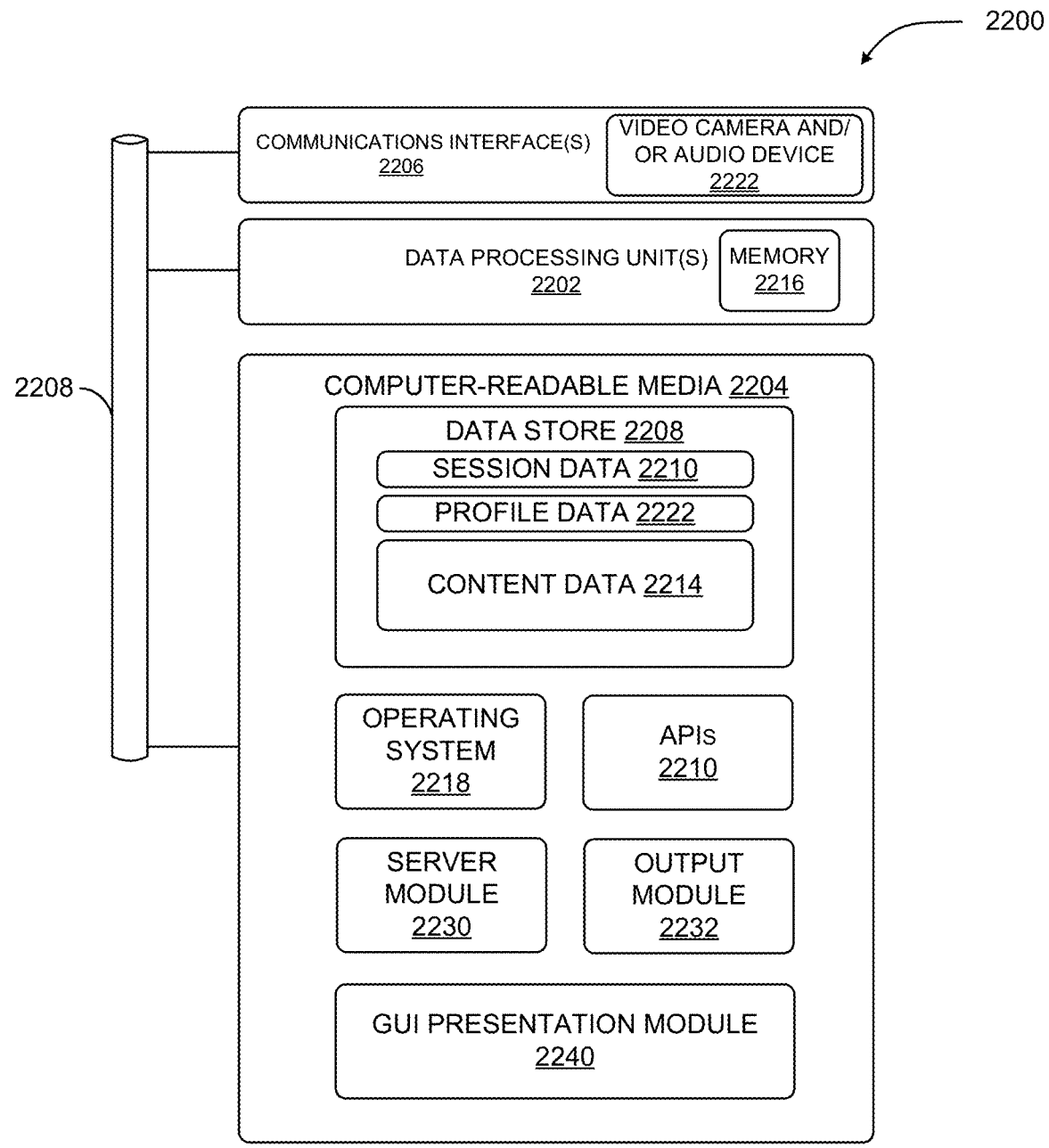
FIG. 22 is a computing device diagram showing aspects of the configuration and operation of a device that can implement aspects of the disclosed technologies, according to one embodiment disclosed herein.

FIG. 22 illustrates a diagram that shows example components of an example device 2200 configured to populate the HCI disclosed herein that may include one or more sections or grids that may render or comprise video, image, virtual objects 116, and/or content for display on the display screen 1228. The device 2200 may represent one of device(s) 102 or 104. Additionally, or alternatively, the device 2200 may represent one of the client computing devices 1106.

As illustrated, the device 2200 includes one or more data processing unit(s) 2202, computer-readable media 2204, and communication interface(s) 2206. The components of the device 2200 are operatively connected, for example, via a bus, which may include one or more of a system bus, a data bus, an address bus, a PCI bus, a Mini-PCI bus, and any variety of local, peripheral, and/or independent buses.

As utilized herein, data processing unit(s), such as the data processing unit(s) 2202 and/or data processing unit(s) 1182, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 2204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 2206 may represent, for example, network interface controllers ("NICs") or other types of transceiver devices to send and receive communications over a network. Furthermore, the communication interface(s) 2206 may include one or more video cameras and/or audio devices 2222 to enable generation of video feeds and/or still images, and so forth.

In the illustrated example, computer-readable media 2204 includes a data store 2208. In some examples, data store 2208 includes data storage such as a database, data warehouse, or other type of structured or unstructured data storage. In some examples, data store 2208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 2208 may store data for the operations of processes, applications, components, and/or modules stored in computer-readable media 2204 and/or executed by data processing unit(s) 2202 and/or accelerator(s). For instance, in some examples, data store 2208 may store session data 2210 (e.g., session data 836), profile data 2222 (e.g., associated with a participant profile), and/or other data. The session data 2210 can include a total number of participants (e.g., users and/or client computing devices) in a communication session, activity that occurs in the communication session, a list of invitees to the communication session, and/or other data related to when and how the communication session is conducted or hosted. The data store 2208 may also include content data 2214, such as the content 850 that includes video, audio, or other content for rendering and display on one or more of the display screens 828.

Alternately, some or all of the above-referenced data can be stored on separate memories 2216 on board one or more data processing unit(s) 2202 such as a memory on board a CPU-type processor, a GPU-type processor, an FPGA-type accelerator, a DSP-type accelerator, and/or another accelerator. In this example, the computer-readable media 2204 also includes operating system 2218 and application programming interface(s) 2210 (APIs) configured to expose the functionality and the data of the device 2200 to other devices. Additionally, the computer-readable media 2204 includes one or more modules such as the server module 2230, the output module 2232, and the GUI presentation module 2240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should be also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein encompasses the subject matter set forth in the following example clauses.

Example Clause A, a system comprising:
one or more data processing units; and
a computer-readable medium having encoded thereon computer-executable instructions to cause the one or more data processing units to:
render a representation of an environment on a user interface (UI), the environment indicative of an interactive communication session among a plurality of users;
receive input data indicative of a position for a zoom window to be placed within the representation of the environment;
in response the input data, render the zoom window on the UI at the position within the representation, the zoom window having a size that is determined based on one or more criteria and having a plurality of selectable regions that are usable to receive user inputs;
render, within the zoom window, a magnified view of a portion of the representation that is proximate to the position of the zoom window, wherein the zoom window is configured to pan the magnified view in response to input received via the zoom window that is indicative of a change to the portion of the representation;
receive, via the selectable regions, input data indicative of a first gesture applied to the zoom window, the first gesture indicative of a new position for the zoom window within the representation;
in response the first gesture, reposition the zoom window on the UI at the new position, wherein the size of the zoom window is maintained during the repositioning; and
render, within the zoom window, a magnified view of a portion of the representation that is proximate to the new position of the zoom window; wherein the zoom window is movable to any rendered portion of the representation.

Example Clause B, the system of Example Clause A, wherein the instructions further cause the one or more data processing units to:
receive input data indicative of a second gesture applied to the zoom window, the second gesture indicative of a new size for the zoom window;
in response the second gesture, render the zoom window on the UI at the position within the three-dimensional representation of the real-world environment with the new size; and
rendering, within the zoom window, a magnified view of an updated portion of the three-dimensional representation that is proximate to the position of the zoom window, wherein the updated portion is determined based on the new size.

Example Clause C, the system of any one of Example Clauses A through B, wherein the second gesture is a resize gesture with two finger inputs applied to one of the selectable regions via a touch-sensitive surface.

Example Clause D, the system of any one of Example Clauses A through C, wherein the instructions further cause the one or more data processing units to:
receive input data indicative of a second gesture applied to the zoom window, the second gesture indicative of a new scale factor for the portion of the three-dimensional representation that is proximate to the position of the zoom window; and
in response the second gesture, update a magnification within the zoom window based on the new scale factor.

Example Clause E, the system of any one of Example Clauses A through D, wherein the second gesture is a pinch gesture applied to a touch-sensitive within the zoom window.

Example Clause F, the system of any one of Example Clauses A through E, wherein the instructions further cause the one or more data processing units to modify a border of the zoom window to indicate the new scale factor.

Example Clause G, the system of any one of Example Clauses A through F, wherein the input data indicative of a first gesture is a voice command.

Example Clause H, the system of any one of Example Clauses A through G, wherein the instructions further cause the one or more data processing units to:
receive input data indicative of a second gesture applied to the zoom window, the second gesture indicative of a rotation of the portion of the three-dimensional representation that is proximate to the position of the zoom window; and
in response the second gesture, update rendered content within the zoom window based on the rotation.

Example Clause I, the system of any one of Example Clauses A through H, wherein a size of the zoom window is based on a distance between a first point and a second point applied to the representation.

Example Clause J, a method for interacting with a rendered environment, the method comprising:
rendering, on a user interface (UI), representation of an environment that is indicative of a communication session among a plurality of users;
receiving input data indicative of a position for a zoom window to be placed within the representation;
in response the input data, rendering the zoom window on the UI at the position within the representation, the zoom window having a plurality of selectable regions that are usable to receive user inputs;

rendering, within the zoom window, a magnified view of a portion of the representation that is proximate to the position of the zoom window;

receiving input data indicative of a first gesture applied to the zoom window, the first gesture indicative of a new position for the zoom window within the representation;

in response the first gesture, repositioning the zoom window on the UI at the new position, wherein the size of the zoom window is maintained during the repositioning; and rendering, within the zoom window, a magnified view of a portion of the representation that is proximate to the new position of the zoom window; wherein the zoom window is movable to any rendered portion of the representation.

Example Clause K, the method of Example Clause J further comprising:

receiving input data indicative of a second gesture applied to the zoom window, the second gesture indicative of a new size for the zoom window;

in response the second gesture, rendering the zoom window on the UI at the position within the representation with the new size; and rendering, within the zoom window, a magnified view of an updated portion of the representation that is proximate to the position of the zoom window, wherein the updated portion is determined based on the new size.

Example Clause L, the method of any one of Example Clauses I through K, wherein the second gesture is a resize gesture with two finger inputs applied to a touch-sensitive surface at edges of the zoom window.

Example Clause M, the method of any one of Example Clauses I through L, further comprising:

receiving input data indicative of a second gesture applied to the zoom window, the second gesture indicative of a new scale factor for the portion of the representation that is proximate to the position of the zoom window; and in response the second gesture, updating a magnification within the zoom window based on the new scale factor.

Example Clause N, the method of any one of Example Clauses I through M, wherein the second gesture is a pinch gesture applied to a touch-sensitive within the zoom window.

Example Clause O, the method of any one of Example Clauses I through N, further comprising modifying a border of the zoom window to indicate the new scale factor.

Example Clause P, the method of any one of Example Clauses I through O, further comprising receiving input data indicative of a second gesture applied to the zoom window, the second gesture indicative of a panning of the portion of the representation that is proximate to the position of the zoom window; and in response the second gesture, updating rendered content within the zoom window based on the panning.

Example Clause Q, a system, comprising:

means for rendering, on a user interface (UI), a representation of an environment that is indicative of a communication session among a plurality of users;

means for receiving input data indicative of a position for a zoom window to be placed within the three representation;

means for rendering the zoom window on the UI at the position within the representation, the zoom window having a size that is determined based on one or more criteria, the zoom window having a plurality of selectable regions that are usable to receive user inputs;

means for rendering, within the zoom window, a magnified view of a portion of the representation that is proximate to the position of the zoom window;

means for receiving input data indicative of a first gesture applied to the zoom window, the first gesture indicative of a new position for the zoom window within the representation;

means for, in response the first gesture, repositioning the zoom window on the UI at the new position, wherein the size of the zoom window is maintained during the repositioning; and means for rendering, within the zoom window, a magnified view of a portion of the representation that is proximate to the new position of the zoom window; wherein the zoom window is movable to any rendered portion of the representation.

Example Clause R, the system of Example Clause Q, further comprising:

means for receiving input data indicative of a second gesture applied to the zoom window, the second gesture indicative of a new size for the zoom window;

means for, in response the second gesture, rendering the zoom window on the UI at the position within the three-dimensional representation of the real-world environment with the new size; and means for rendering, within the zoom window, a magnified view of an updated portion of the three-dimensional representation that is proximate to the position of the zoom window, wherein the updated portion is determined based on the new size.

Example Clause S, the system of any of Example Clauses Q through R, wherein the input data indicative of a first gesture is a voice command.

Example Clause T, the system of any one of Example Clauses Q through S, wherein a size of the zoom window is based on a distance between a first point and a second point applied to the representation.

The disclosure presented herein encompasses the subject matter set forth in the following example clauses.

Example Clause AA, a system comprising:

one or more data processing units; and a computer-readable medium having encoded thereon computer-executable instructions to cause the one or more data processing units to:

render a representation of an environment on a user interface (UI), the environment indicative of an interactive communication session among a plurality of users;

receive input data indicative of a position for a zoom window to be placed within the representation;

in response the input data, render the zoom window on the UI at the position within the representation;

render, within the zoom window, a magnified view of a portion of the representation that is proximate to the position of the zoom window;

receive input data indicative of a first gesture applied to the zoom window, the first gesture indicative of a resizing of the zoom window;

in response the first gesture, resize the zoom window on the UI in accordance with the first gesture, wherein a scale of the magnified view within the zoom window is maintained as the zoom window is resized;

receive input data indicative of a second gesture applied to the zoom window, the second gesture indicative of a change to a zoom scale for content within the zoom window;

in response the second gesture, update the magnified view of the portion of the representation that is proximate to the position of the zoom window on the UI in accordance with the second gesture, wherein the size of the zoom window is maintained as the magnified view is updated;

identify source files or documents for content that is rendered within the zoom window;

allow access to the source files or documents during the interactive communication session; and identify additional source files or documents for new content that is rendered in the representation.

Example Clause BB, the system of Example Clause AA wherein the instructions further cause the one or more data processing units to:

receive input data indicative of a third gesture applied to the zoom window, the third gesture indicative of a new position for the zoom window within the representation;

in response the third gesture, reposition the zoom window on the UI at the new position, wherein the size of the zoom window is maintained during the repositioning; and rendering, within the zoom window, an updated magnified view of an updated portion of the representation that is proximate to the new position of the zoom window.

Example Clause CC, the system of any one of Example Clauses AA through BB, wherein the first gesture is a resize gesture with two finger inputs applied to a touch-sensitive surface at edges of the zoom window.

Example Clause DD, the system of any one of Example Clauses AA through CC, wherein the second gesture is a pinch gesture applied to a touch-sensitive within the zoom window.

Example Clause EE, the system of any one of Example Clauses AA through DD, wherein the instructions further cause the one or more data processing units to modify a border of the zoom window to indicate the changed zoom scale.

Example Clause FF, the system of any one of Example Clauses AA through EE, wherein the representation is a video feed of a collaborative work environment.

Example Clause GG, the system of any one of Example Clauses AA through FF, wherein the instructions further cause the one or more data processing units to:

receive input data indicative of a third gesture applied to the zoom window, the third gesture indicative of a scrolling of the portion of the representation that is proximate to the position of the zoom window; and in response the third gesture, update rendered content within the zoom window based on the scrolling.

Example Clause HH, the system of any one of Example Clauses AA through GG, wherein the instructions further cause the one or more data processing units to:

automatically reposition the zoom window to remain proximate to a new position of the participant when the participant moves.

Example Clause II, the system of any one of Example Clauses AA through HH, wherein the instructions further cause the one or more data processing units to:

receive input data indicative of a change in perspective of the representation; and in response to the change in perspective, automatically reposition the zoom window to maintain the view of the portion of the representation.

Example Clause JJ, a method for interacting with a rendered environment, the method comprising:

rendering, on a user interface (UI), a representation indicative of an interactive communication session among a plurality of users;

receiving input data indicative of a position for a zoom window to be placed within the representation;

in response the input data, rendering the zoom window on the UI at the position within the representation, the zoom window having a size that is determined based on one or more criteria;

rendering, within the zoom window, a magnified view of a portion of the representation that is proximate to the position of the zoom window;

receiving input data indicative of a first gesture applied to the zoom window, the first gesture indicative of a resizing of the zoom window;

in response the first gesture, resizing the zoom window on the UI in accordance with the first gesture, wherein a scale of the magnified view within the zoom window is maintained as the zoom window is resized;

receiving input data indicative of a second gesture applied to the zoom window, the second gesture indicative of a change to a zoom scale for content within the zoom window;

in response the second gesture, updating the magnified view of the portion of the representation that is proximate to the position of the zoom window on the UI in accordance with the second gesture, wherein the size of the zoom window is maintained as the magnified view is updated;

identifying source files or documents for content that is rendered within the zoom window;

allowing access to the source files or documents during the interactive communication session; and identifying additional source files or documents for new content that is rendered in the representation.

Example Clause KK, the method of Example Clause JJ further comprising:

receiving input data indicative of a third gesture applied to the zoom window, the third gesture indicative of a new position for the zoom window within the representation;

in response the third gesture, repositioning the zoom window on the UI at the new position, wherein the size of the zoom window is maintained during the repositioning; and rendering, within the zoom window, an updated magnified view of an updated portion of the representation that is proximate to the new position of the zoom window.

Example Clause LL, the method of any one of Example Clauses II through KK, wherein the first gesture is a resize gesture with two finger inputs applied to a touch-sensitive surface at edges of the zoom window.

Example Clause MM, the method of any one of Example Clauses II through LL, wherein the second gesture is a pinch gesture applied to a touch-sensitive within the zoom window.

Example Clause NN, the method of any one of Example Clauses II through MM, wherein the representation is a video feed of a collaborative work environment.

Example Clause OO, the method of any one of Example Clauses II through NN, further comprising:

receiving input data indicative of a third gesture applied to the zoom window, the third gesture indicative of a scrolling of the portion of the representation that is proximate to the position of the zoom window; and in response the third gesture, updating rendered content within the zoom window based on the scrolling.

Example Clause PP, a system comprising:

means for rendering, on a user interface (UI), a representation of a real-world environment;

means for receiving input data indicative of a position for a zoom window to be placed within the representation;

means for, in response the input data, rendering the zoom window on the UI at the position within the representation, the zoom window having a size that is determined based on one or more criteria;

means for rendering, within the zoom window, a magnified view of a portion of the representation that is proximate to the position of the zoom window;

means for receiving input data indicative of a first gesture applied to the zoom window, the first gesture indicative of a resizing of the zoom window;

means for, in response the first gesture, resizing the zoom window on the UI in accordance with the first gesture, wherein a scale of the magnified view within the zoom window is maintained as the zoom window is resized;

means for, receiving input data indicative of a second gesture applied to the zoom window, the second gesture indicative of a change to a zoom scale for content within the zoom window;

means for, in response the second gesture, updating the magnified view of the portion of the representation that is proximate to the position of the zoom window on the UI in accordance with the second gesture, wherein the size of the zoom window is maintained as the magnified view is updated;

means for identifying source files or documents for content that is rendered within the zoom window;

means for allowing access to the source files or documents during the interactive communication session; and means for identifying additional source files or documents for new content that is rendered in the representation.

Example Clause QQ, the system of Example Clause PP, further comprising:

means for receiving input data indicative of a third gesture applied to the zoom window, the third gesture indicative of a new position for the zoom window within the representation;

means for, in response the third gesture, repositioning the zoom window on the UI at the new position, wherein the size of the zoom window is maintained during the repositioning; and means for rendering, within the zoom window, an updated magnified view of an updated portion of the representation that is proximate to the new position of the zoom window.

Example Clause RR, the system of any of Example Clauses PP through QQ, further comprising means for modifying a border of the zoom window to indicate the changed zoom scale.

Example Clause SS, the system of any one of Example Clauses PP through RR, wherein the portion of the representation that is proximate to the position of the zoom window comprises a participant, further comprising:

means for automatically repositioning the zoom window to remain proximate to a new position of the participant when the participant moves.

Example Clause TT, the system of any one of Example Clauses PP through SS, further comprising:

means for receiving input data indicative of a change in perspective of the representation; and means for, in response to the change in perspective, automatically repositioning the zoom window to maintain the view of the portion of the three-dimensional representation.

The disclosure presented herein encompasses the subject matter set forth in the following example clauses.

Example Clause AAA, a system comprising:
one or more data processing units; and
a computer-readable medium having encoded thereon computer-executable instructions to cause the one or more data processing units to:
render, on a user interface (UI), a contemporaneous representation of an environment indicative of an interactive communication session among a plurality of users;
receive first input data indicative of a position for a zoom window to be placed within the representation;
in response the first input data, render the zoom window on the UI at the position within the representation;
rendering, within the zoom window, a magnified view of a portion of the representation that is proximate to the position of the zoom window;
receive second input data indicative of an interaction with the zoom window;
in response the interaction, render an editing pane on the UI, wherein the editing pane comprises:
a representation of content of the zoom window; and
one or more selectable options for actions to be applied to the content; and
receive third input data indicative of a selection of one of the selectable options; and
in response the selection, performing an editing action on the content;
wherein the editing pane is configured to send data indicative of the actions, the data usable to render a shared and contemporaneously updated view of the actions to the interactive communication session.

Example Clause BBB, the system of Example Clause AAA, wherein the selectable options are determined based on a context of contents of the zoom window.

Example Clause CCC, the system of any one of Example Clauses AAA through BBB, wherein the selectable options include storing contents of the zoom window.

Example Clause DDD, the system of any one of Example Clauses AAA through CCC, wherein the instructions further cause the one or more data processing units to:
identify a source file for the content, wherein the selectable options include accessing the source file.

Example Clause EEE, the system of any one of Example Clauses AAA through DDD, wherein the instructions further cause the one or more data processing units to:
identify a rendering device for the content, wherein the selectable options include inputting one or more commands to the rendering device for updating the rendered content.

Example Clause FFF, the system of any one of Example Clauses AAA through EEE, wherein the instructions further cause the one or more data processing units to:
identify available image capture devices for the real-world environment; and
based on the content of the zoom window, changing a current image capture device for providing images for the three-dimensional representation to improve an image quality of rendered content.

Example Clause GGG, the system of any one of Example Clauses AAA through FFF, wherein the selectable options include sending the contents or the source file to a selected recipient.

Example Clause HHH, the system of any one of Example Clauses AAA through GGG, wherein the selectable options include sending the content or the source file to a selected recipient.

Example Clause III, the system of any one of Example Clauses AAA through HHH, wherein the editing pane includes a timeline that is navigable to time points of an event captured of the environment.

Example Clause JJJ, the system of any one of Example Clauses AAA through III, wherein the selectable options include sending an object that is representative of the real-world environment to a selected user, wherein the object is usable to join a current collaborative session in the environment.

Example Clause KKK, a method for interacting with a rendered environment, the method comprising:

rendering, on a user interface (UI), a representation of an environment indicative of an interactive communication session among a plurality of users;

receiving first input data indicative of a position for a zoom window to be placed within the representation;

in response the first input data, rendering the zoom window on the UI at the position within the representation;

rendering, within the zoom window, a magnified view of a portion of the representation that is proximate to the position of the zoom window;

receiving second input data indicative of an interaction with the zoom window;

in response the interaction, rendering an editing pane on the UI, wherein the editing pane comprises:

a representation of content of the zoom window; and one or more selectable options for actions to be applied to the content;

receive third input data indicative of a selection of one of the selectable options; and in response the selection, performing an editing action on the content;

wherein the editing pane is configured to send data indicative of the actions, the data usable to render a shared and contemporaneously updated view of the actions to the users of the interactive communication session.

Example Clause LLL, the method of Example Clause KKK wherein the selectable options are determined based on a context of contents of the zoom window.

Example Clause MMM, the method of any one of Example Clauses KKK through LLL, wherein the selectable options include storing contents of the zoom window.

Example Clause NNN, the method of any one of Example Clauses KKK through MMM, further comprising:

identifying a source file for the content, wherein the selectable options include accessing the source file.

Example Clause OOO, the method of any one of Example Clauses KKK through NNN, further comprising:

identifying a rendering device for the content, wherein the selectable options include inputting one or more commands to the rendering device for updating the rendered content.

Example Clause PPP, a system comprising:

means for rendering, on a user interface (UI), a representation of a real-world environment;

means for receiving first input data indicative of a position for a zoom window to be placed within the three-dimensional representation of the real-world environment;

means for, in response the first input data, rendering the zoom window on the UI at the position within the representation of the real-world environment;

means for rendering, within the zoom window, a magnified view of a portion of the representation that is proximate to the position of the zoom window;

means for receiving second input data indicative of an interaction with the zoom window;

means for, in response the interaction, rendering an editing pane on the UI, wherein the editing pane comprises:

a representation of content of the zoom window; and one or more selectable options for actions to be applied to the content; and receive third input data indicative of a selection of one of the selectable options; and in response the selection, performing an editing action on the content; and means for sending data indicative of the actions, the data usable to render a shared and contemporaneously updated view of the actions.

Example Clause QQQ, the system of Example Clause PPP, wherein contents of the editing pane and permissions for allowable actions are determined based on a role of a user of the editing pane.

Example Clause RRR, the system of any of Example Clauses PPP through QQQ, further comprising:

means for identifying available image capture devices for the real-world environment; and means for, based on the content of the zoom window, changing a current image capture device for providing images for the three-dimensional representation to improve an image quality of rendered content.

Example Clause SSS, the system of any one of Example Clauses PPP through RRR, wherein the selectable options include sending the contents or the source file to a selected recipient.

Example Clause TTT, the system of any one of Example Clauses PPP through SSS, wherein contents of the editing pane and permissions for allowable actions are determined based on a role of a user of the editing pane.

Among many other technical benefits, the technologies herein enable more efficient use of computing resources such as processor cycles, memory, network bandwidth, and power, as compared to previous solutions relying upon inefficient manual placement of virtual objects in a 3D environment. Other technical benefits not specifically mentioned herein can also be realized through implementations of the disclosed subject matter.

Although the techniques have been described in language specific to structural features and/or methodological acts, it is to be understood that the appended claims are not necessarily limited to the features or acts described. Rather, the features and acts are described as example implementations of such techniques.

What is claimed is:

1. A system comprising:
   one or more data processing units; and
   a computer-readable medium having encoded thereon computer-executable instructions to cause the one or more data processing units to:
   render a representation of an environment on a user interface (UI), the environment indicative of an interactive communication session among a plurality of users;
   receive input data indicative of a position for a zoom window to be placed within the representation of the environment;
   in response the input data, render the zoom window on the UI at the position within the representation, the zoom window having a size that is determined based on one or more criteria and having a plurality of selectable regions that are usable to receive user inputs;
   render, within the zoom window, a magnified view of a portion of the representation that is proximate to the position of the zoom window, wherein the zoom window is configured to pan the magnified view in response to input received via the zoom window that is indicative of a change to the portion of the representation;

receive, via the selectable regions, input data indicative of a first gesture applied to the zoom window, the first gesture indicative of a new position for the zoom window within the representation;

in response the first gesture, reposition the zoom window on the UI at the new position, wherein the size of the zoom window is maintained during the repositioning; and render, within the zoom window, a magnified view of a portion of the representation that is proximate to the new position of the zoom window; wherein the zoom window is movable to any rendered portion of the representation.

2. The system of claim 1, wherein the instructions further cause the one or more data processing units to:

receive input data indicative of a second gesture applied to the zoom window, the second gesture indicative of a new size for the zoom window;

in response the second gesture, render the zoom window on the UI at the position within the three-dimensional representation of the real-world environment with the new size; and rendering, within the zoom window, a magnified view of an updated portion of the three-dimensional representation that is proximate to the position of the zoom window, wherein the updated portion is determined based on the new size.

3. The system of claim 2, wherein the second gesture is a resize gesture with two finger inputs applied to one of the selectable regions via a touch-sensitive surface.

4. The system of claim 1, wherein the instructions further cause the one or more data processing units to:

receive input data indicative of a second gesture applied to the zoom window, the second gesture indicative of a new scale factor for the portion of the three-dimensional representation that is proximate to the position of the zoom window; and in response the second gesture, update a magnification within the zoom window based on the new scale factor.

5. The system of claim 4, wherein the second gesture is a pinch gesture applied to a touch-sensitive within the zoom window.

6. The system of claim 4, wherein the instructions further cause the one or more data processing units to modify a border of the zoom window to indicate the new scale factor.

7. The system of claim 1, wherein the input data indicative of a first gesture is a voice command.

8. The system of claim 1, wherein the instructions further cause the one or more data processing units to:

receive input data indicative of a second gesture applied to the zoom window, the second gesture indicative of a rotation of the portion of the three-dimensional representation that is proximate to the position of the zoom window; and in response the second gesture, update rendered content within the zoom window based on the rotation.

9. The system of claim 1, wherein a size of the zoom window is based on a distance between a first point and a second point applied to the representation.

10. A method for interacting with a rendered environment, the method comprising:

rendering, on a user interface (UI), representation of an environment that is indicative of a communication session among a plurality of users;

receiving input data indicative of a position for a zoom window to be placed within the representation;

in response the input data, rendering the zoom window on the UI at the position within the representation, the zoom window having a plurality of selectable regions that are usable to receive user inputs;

rendering, within the zoom window, a magnified view of a portion of the representation that is proximate to the position of the zoom window;

receiving input data indicative of a first gesture applied to the zoom window, the first gesture indicative of a new position for the zoom window within the representation;

in response the first gesture, repositioning the zoom window on the UI at the new position, wherein the size of the zoom window is maintained during the repositioning; and rendering, within the zoom window, a magnified view of a portion of the representation that is proximate to the new position of the zoom window; wherein the zoom window is movable to any rendered portion of the representation.

11. The method of claim 10, further comprising:

receiving input data indicative of a second gesture applied to the zoom window, the second gesture indicative of a new size for the zoom window;

in response the second gesture, rendering the zoom window on the UI at the position within the representation with the new size; and rendering, within the zoom window, a magnified view of an updated portion of the representation that is proximate to the position of the zoom window, wherein the updated portion is determined based on the new size.

12. The method of claim 11, wherein the second gesture is a resize gesture with two finger inputs applied to a touch-sensitive surface at edges of the zoom window.

13. The method of claim 10, further comprising:

receiving input data indicative of a second gesture applied to the zoom window, the second gesture indicative of a new scale factor for the portion of the representation that is proximate to the position of the zoom window; and in response the second gesture, updating a magnification within the zoom window based on the new scale factor.

14. The method of claim 13, wherein the second gesture is a pinch gesture applied to a touch-sensitive within the zoom window.

15. The method of claim 13, further comprising modifying a border of the zoom window to indicate the new scale factor.

16. The method of claim 10, further comprising receiving input data indicative of a second gesture applied to the zoom window, the second gesture indicative of a panning of the portion of the representation that is proximate to the position of the zoom window; and in response the second gesture, updating rendered content within the zoom window based on the panning.

17. A system, comprising:

means for rendering, on a user interface (UI), a representation of an environment that is indicative of a communication session among a plurality of users;

means for receiving input data indicative of a position for a zoom window to be placed within the three representation;

means for rendering the zoom window on the UI at the position within the representation, the zoom window having a size that is determined based on one or more criteria, the zoom window having a plurality of selectable regions that are usable to receive user inputs;

means for rendering, within the zoom window, a magnified view of a portion of the representation that is proximate to the position of the zoom window;

means for receiving input data indicative of a first gesture applied to the zoom window, the first gesture indicative of a new position for the zoom window within the representation;

means for, in response the first gesture, repositioning the zoom window on the UI at the new position, wherein the size of the zoom window is maintained during the repositioning; and means for rendering, within the zoom window, a magnified view of a portion of the representation that is proximate to the new position of the zoom window; wherein the zoom window is movable to any rendered portion of the representation.

18. The system of claim 17, further comprising:
means for receiving input data indicative of a second gesture applied to the zoom window, the second gesture indicative of a new size for the zoom window;

means for, in response the second gesture, rendering the zoom window on the UI at the position within the three-dimensional representation of the real-world environment with the new size; and means for rendering, within the zoom window, a magnified view of an updated portion of the three-dimensional representation that is proximate to the position of the zoom window, wherein the updated portion is determined based on the new size.

19. The system of claim 17, wherein the input data indicative of a first gesture is a voice command.

20. The system of claim 17, wherein a size of the zoom window is based on a distance between a first point and a second point applied to the representation.

* * * * *